US011119800B1

(12) United States Patent
Kowalski

(10) Patent No.: US 11,119,800 B1
(45) Date of Patent: Sep. 14, 2021

(54) DETECTING AND MITIGATING HARDWARE COMPONENT SLOW FAILURES

(71) Applicant: Amazon Technologies, Inc., Seattle, WA (US)

(72) Inventor: Marcin Piotr Kowalski, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 134 days.

(21) Appl. No.: 16/022,626

(22) Filed: Jun. 28, 2018

(51) Int. Cl.
*G06F 9/455* (2018.01)
*G06F 3/06* (2006.01)
*H04L 1/18* (2006.01)

(52) U.S. Cl.
CPC .......... *G06F 9/45558* (2013.01); *G06F 3/061* (2013.01); *H04L 1/18* (2013.01); *G06F 2009/45579* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 2015/0339180 | A1* | 11/2015 | Shih | G06F 11/0793 714/49 |
| 2018/0107566 | A1* | 4/2018 | Hardy | G06F 11/2048 |
| 2019/0327179 | A1* | 10/2019 | Millin | G06F 9/45533 |

OTHER PUBLICATIONS

Adrian Colyer, The morning paper blog, "Fail-slow at scale: evidence of hardware performance faults in large production systems," published Feb. 26, 2018, retrieved from https://blog.acolyer.org/2018/02/26/fail-slow-at-scale-evidence-of-hardware-performance-faults-in-large-production-systems on Mar. 26, 2018, 5 pages.
Haryadi S. Gunawi et al; "Fail-Slow at Scale: Evidence of Hardware Performance Faults in Large Production Systems", Proceedings of the 16th USENIX Conference on File and Storage Technologies, Feb. 12-15, 2018, Oakland, CA, USA, ISBN 978-1-931971-42-3, 15 pages.

* cited by examiner

*Primary Examiner* — Lewis A Bullock, Jr.
*Assistant Examiner* — Melissa A Headly
(74) *Attorney, Agent, or Firm* — Nicholson De Vos Webster & Elliott LLP

(57) ABSTRACT

Techniques for monitoring computer system components for degraded operation are described. In some embodiments, a baseline performance metric value is received from a system monitoring service, a request directed to an input/output (I/O) device is received that was generated by a first computing device, a timer is started, the timer having a duration based on the baseline performance metric value, the received request is sent to the I/O device, an error message is generated upon expiration of the duration of the timer before a response to the request is received from the I/O device, and the generated error message is sent to a second computing device to cause the second computing device to perform at least one action in response to the generated error message.

20 Claims, 15 Drawing Sheets

DETECTING AND MITIGATING HARDWARE COMPONENT SLOW FAILURES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers (or users). Some public data center operators provide network access, power, and secure installation facilities for hardware owned by various customers, while other public data center operators provide "full service" facilities that also include hardware resources made available for use by their customers.

Large data centers are often the behind-the-scenes workhorses supporting the software and services colloquially referred to as being "in the cloud." Data centers themselves are generally composed of arrays of networked computer systems, and many data centers might be geographically distributed to reduce latency and network bottlenecks in providing the software and services to customers and to customers of customers that are geographically distributed. The resulting cloud provider system is a many-tiered structure of systems, or a system of systems, ranging from basic hardware components like cooling fans and power supplies, up through number-crunching processors connected by miles of network cabling, to functional systems like regional gateways, virtual private networks, data compute and storage services, database services, machine learning services, and many others. Many layers of abstraction often separate a service that a customer sees from the actual hardware components executing the software, storing the data, or otherwise providing the service. As the scale and scope of typical data centers has increased, tasks such as provisioning, administering, and managing the components that make up a data center have become increasingly complicated.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for managing not-fatal hardware issues in a data center or other distributed computing environment. The complexity of such systems means that non-fatal hardware issues—or issues resulting in hardware that continues to operate in a degraded manner—can manifest symptoms in unpredictable, illogical, and sometimes counterintuitive ways. Such non-fatal hardware issues, also referred to herein as degraded performance issues, are distinct from fatal hardware issues where the component ceases to function. For example, a failing switch in a cooling fan might cause the fan to run but never at full rotations per minute. The reduced fan speed might cause the internal temperature of one central processing unit (CPU) to intermittently increase. The CPU might detect the temperature increase and respond by throttling its performance to reduce power consumption (and thus also reduce heat generation). A load balancing service might detect the lowered performance of the CPU and shift processing tasks away from the CPU. Then, at some point later when the CPU has cooled and is no longer tasked with operations, the load balancing service might re-provision the CPU for another task, causing the cycle of deprovisioning and provisioning of the CPU to repeat. In systems of systems, these kinds of failures are difficult to detect, isolate, and diagnose before the component becomes inoperable, if ever, and can cause many undesired effects on the provider system. This "gray" area between nominal and degraded or otherwise abnormal component performance presents significant challenges for the management, maintenance, and reliability of the data center.

Figure 1:
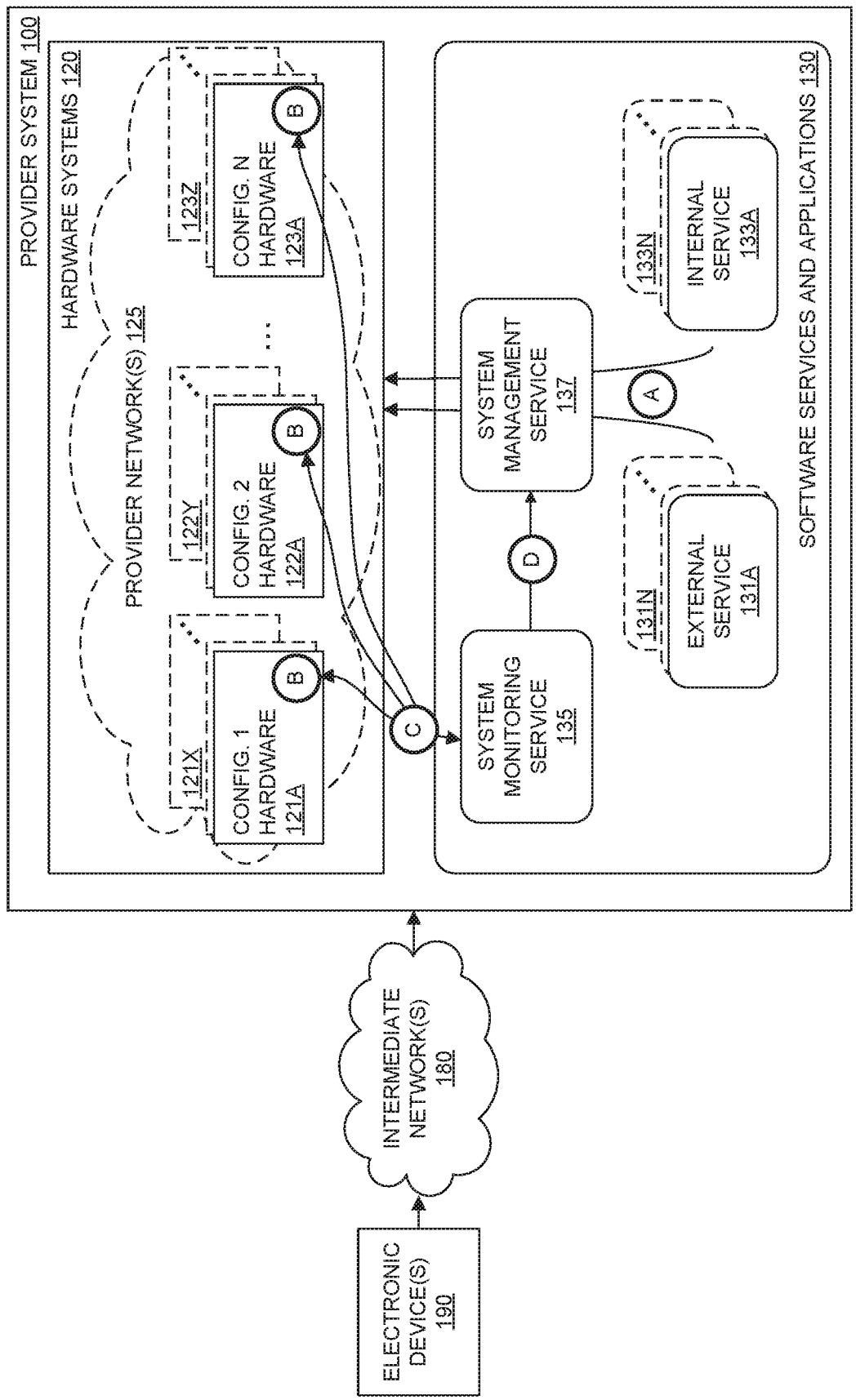
FIG. 1 illustrates an exemplary provider system according to some embodiments.

FIG. 1 illustrates an exemplary provider system 100 according to some embodiments. Provider system 100 communicates with one or more electronic devices 190 via one or more intermediate networks 180. Provider system 100 includes hardware systems 120 and software services and applications 130. Hardware systems 120 are generally coupled or interconnected by one or more networks 125.

At a high level, provider system 100 includes processes to measure component performance, to identify components that are underperforming, and to cause the system to isolate the underperforming component, preferably before the component causes disruption within the provider system 100. As indicated by the circle labeled "A" in FIG. 1, some number of internal and/or external services (e.g., software programs or applications) have certain hardware requirements. In one embodiment, system management service 137 includes one or more services that perform a variety of tasks, including dynamically provisioning hardware systems 120 based on the demands of the services, migrating instances of services between hardware systems 120, and the like. For example, system management service 137 might provision configuration 1 hardware system 121A for an instance of internal service 133A, and later migrate that instance to configuration 1 hardware system 121B. As indicated by circle B, hardware systems 120 have software monitoring processes that measure component performance and/or intermediary processes that terminate operations with hardware components that demonstrate atypical or degraded performance relative to a baseline. In some embodiments, a monitor process measures one or more performance metrics of one or more components within the system, and multiple monitoring processes may be executed on a single hardware system 120 to measure different components within the system. Each system may have a different set of monitoring processes. In some embodiments, an intermediary process terminates operations with a hardware component that exceed certain limits, or baseline performance metrics, as described below.

As indicated by circle C, a system monitoring service 135 obtains performance metrics from the various monitoring processes executing throughout the provider system 100. System monitoring service 135 checks the obtained performance metrics against baseline performance metrics to detect abnormal component performance. In addition, system monitoring service 135 may aggregate the obtained performance metrics to model baseline performance metrics for components. When a hardware component fails a check, system monitoring service 135 sends a message to a system management service 137, as indicated by circle D.

System management service 137 may be a single service or a plurality of different services responsible for the provisioning and de-provisioning, sometimes referred to as allocation and de-allocation, of hardware systems 120 for user or customer and provider requirements. For example, a customer might want a cluster of computers connected via a virtual private network. In such a case, system management service 137 coordinates the allocation of available hardware systems 120 to the customer and the setup of security and routing protocols for the allocated hardware systems 120, etc. As another example, the provider may have a billing service that executes occasionally to calculate customer usage of resources within the provider system 100. System management service 137 again coordinates the allocation of available hardware systems 120 to the billing service. The allocation and setup of systems for customer and/or provider requirements may be aided by one or more internal services within the provider system 100.

In addition to facilitating the provisioning and de-provisioning of hardware systems 120, system management service 137 causes the migration of software applications and/or services from one hardware systems 120 to another hardware system 120. One reason for migrating between hardware systems 120 is component performance degradation. As described above, components within systems can begin to exhibit degraded performance that affects the provider system 100 in ways that are relatively unpredictable and difficult to trace. To mitigate the impact of degraded performance on the provider system 100, upon receiving an indication of a failing component within the provider network at circle D, system management service 137 attempts to isolate the component by reconfiguring the allocation of user, customer, or provider requirements to other hardware systems within the provider system 100. For example, if a computer system executing software for a customer is identified as having a failing component, system management service 137 can cause the startup of a spare computer system, the migration of the software (and its associated state) from the failing system to the spare system, and the re-routing of data traffic from the failing system to the spare system, preferably without interrupting the customer or its software.

As used herein, the term "system" may be used to refer to any group of components that operate together, and the term "component" may be used to refer to a part of a system. For example, a cooling fan is a system that includes components like a housing, fan blades, an electric motor, electronic circuitry, ball bearings, and the like. The electronic circuitry itself can be considered a system including transistors, capacitors, voltage regulators, a microprocessor, etc. As another example, a microprocessor is also a system that includes computing circuitry, cache memories, input/output (I/O) circuitry, and the like. Taken together, a processor and a cooling fan might each be a component of a system, which may include other components like a motherboard, memory, networking devices, etc.

Within a provider system 100, hardware systems 120 generally include hardware systems of varying configurations that are deployed in the provider system 100. The deployment of multiple configurations of hardware systems 120 within the provider system 100 provides scaling (e.g., the ability to reduce or increase the number of systems working on a task) and redundancy (e.g., having available backup systems in case a system fails). To further expand the amount of redundancy within provider system 100, in some embodiments, different configurations of hardware systems are further grouped into classes that, although not of the same configuration, meet certain performance requirements, include certain specialized components, etc. Examples of hardware systems 120 are described below with reference to FIGS. 2 and 3. Hardware systems 120 can be general purpose computing systems or special purpose computing systems. For example, some hardware systems 120 might be routers dedicated to the routing of traffic within network(s) 125, while other hardware systems 120 might be general purpose computing systems that can be used for a variety of tasks, such as executing management software for the provider system 100 or customer software for customers of provider system 100. In general, hardware systems 120 include many hardware components, such as power supplies, fans, processors, storage devices, network interfaces, and the like, and each component may have numerous subcomponents (e.g., fan bearings, processor cores and cache, storage device or network interface buffers or controllers, etc.). The components of a hardware system are generally coupled together by one or more interconnects, such as QuickPath Interconnect (QPI), Peripheral Component Interconnect (PCI), Peripheral Component Interconnect Express (PCIe), Small Computer System Interface (SCSI), Serial Attach SCSI (SAS), AT Attachment (ATA), variants or progeny of each, and the like. Hardware systems 120 are generally coupled by one or more interconnects (not shown), such as Ethernet, Infiniband, and/or Fibre Channel networks.

Provider systems 100 often include many hardware systems of the same class or configuration, such as configuration 1 hardware systems 121A-121X, configuration 2 hardware systems 122A-122Y, configuration N hardware systems 123A-123Z, etc., where N is the number of different logically or physically replaceable classes of hardware and X, Y, and Z are the number of available hardware systems of a particular configuration. Configurations can vary based on their constituent hardware components. For example, one configuration could include a particular processor, memory, storage device, and network interface card, while another configuration might have the same processor, memory, and storage device, but a different network interface card. Configurations can also vary based on their relative location or access to other resources within provider system 100. For example, certain classes of hardware may include similar or identical components but be classified as distinct entities based on their relative access to other resources within the provider system 100. For example, a certain type of general purpose computing system might be "closer" (on the network) to a high-speed network connection to the Internet or to a large storage volume array than another general-purpose computing system, making it more suitable for handling data traffic into and out the provider system 100 or for providing database services, respectively. In some embodiments, although the two general-purpose computing systems are of the same type or are structurally similar, they are nonetheless part of different hardware classes based on their locations within the provider system 100.

Software services and applications 130 generally refer to computer software programs that perform functions of the provider system 100. These programs may be viewed as services of the provider system 100. In many cases, software services and applications 130 can be broken down into internal services 133A-133N and external services 131A-131N. External services 131 generally include services that available to users of the provider system 100. External services 131 provide users with the ability to utilize one or more of a variety of types of computing-related resources such as compute resources (e.g., executing virtual machine (VM) instances and/or containers, executing batch jobs, executing code without provisioning servers, etc.), data/storage resources (e.g., object storage, block-level storage, data archival storage, etc.), network-related resources (e.g., configuring virtual networks including groups of compute resources, content delivery networks (CDNs), Domain Name Service (DNS), etc.), application resources (e.g., databases, application build/deployment services, etc.), and the like. To provide these and other computing resource services, provider systems 100 often rely upon virtualization techniques, where one or multiple resources can be provided to one or multiple users via a single system.

For example, virtualization technologies may be used to provide users the ability to control or utilize compute instances. In virtualization technologies, a hypervisor program typically manages one or more guest operating systems (OS) that are under control of users or customers. The hypervisor intercepts and manages guest OS calls to the underlying, shared hardware system. The hypervisor itself may operate on top of an underlying host OS. In some embodiments, the hypervisor program is executed on the same processor(s) as the guest OS. In other embodiments, the hypervisor executes on different processor(s) than the guest OS. Virtualization allows a user access to a compute instance hosted by the provider system 100 to perform a variety of computing tasks. For example, a compute virtualization service can provide compute instances, a storage virtualization service can store data objects, a block storage virtualization service can provide logical storage volumes to compute instances, etc.

The provider systems 100 may also provide users with the ability to indirectly utilize compute instances by submitting code to be executed by the provider system. Such code may be packaged in a software construct (e.g., a container) that includes both the user's code and any code dependencies (e.g., libraries) so that the code can run on many combinations of hardware and operating systems. In such cases, the user typically has no control or knowledge of the underlying hardware system(s) involved.

Users may access external services 131 across one or more intermediate networks 180 (e.g., the internet) via one or more interfaces, such as through use of application programming interface (API) calls, via a console implemented as a website or application, etc. The interface(s) and associated external services 131 may serve as a front-end to internal services 133 that support external services 131.

Internal services 133 generally include services that facilitate the management and administration of the provider system 100 or that support external services 131. For example, some internal services may track user usage of external services 131 for billing purposes. Other internal services may monitor the allocation of hardware resources to processing tasks and migrate certain tasks to other parts of the data center or to other data centers to balance the computing workload of the provider system. In some embodiments, select internal services 133 are part of a control plane of the provider system 100.

Services often include one or more application programming interfaces (APIs) to facilitate intra-service communications. For example, an external service may receive an API message from a user requesting a dedicated compute instance. The external service could then send API requests to various internal services to assign one or more hardware systems or a portion of a hardware system to the user, to instantiate a computing environment on the assigned systems, to route traffic between the user and the assigned system(s), and/or to track usage to allocate cost to the user.

The relation between software services and underlying hardware systems can be tailored to the particular service and its requirements. Some services may have requirements that include parallel processing, parallel storage, graphics rendering, load balancing, etc. Some services might require multiple hardware systems with a common configuration or multiple hardware systems with different configurations. Some services might require a dedicated hardware system, while other services might share a hardware system with one or more other services (including other instances of the same service). Some services might require a specialized hardware system, while other services might be hardware system agnostic. Some services might continuously execute, while other services start and stop on an as-needed basis.

Figure 2:
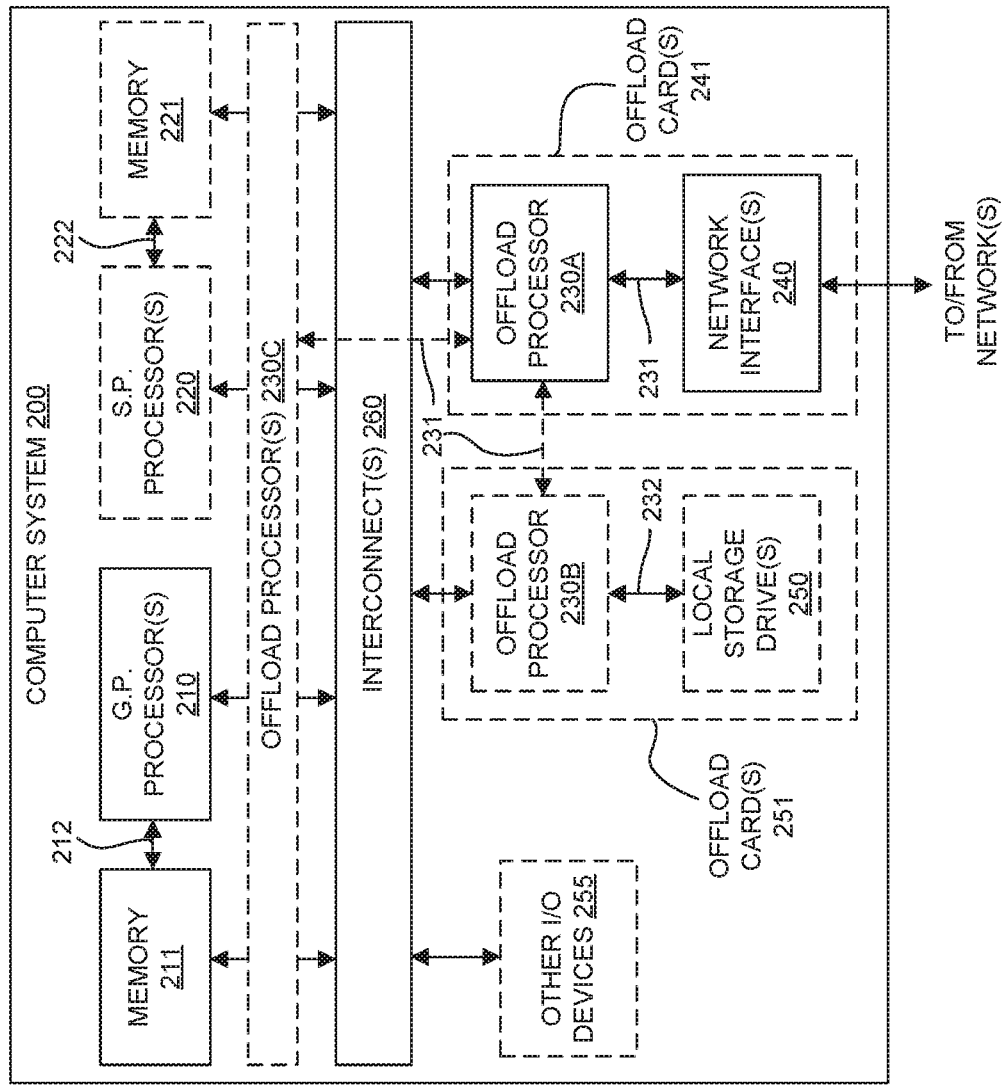
FIG. 2 is a block diagram of an exemplary computer system according to some embodiments.

FIG. 2 is a block diagram of an exemplary computer system 200 according to some embodiments. Embodiments of computer system 200 can correspond to hardware systems in one or more configurations (e.g., 121, 122, 123). Computer system 200 includes one or more general purpose (GP) processors 210, memory 211, one or more network interfaces 240, and interconnect(s) 260. In embodiments with multiple GP processors 210, each processor may have a dedicated bank of memory 211 or may share memory 211 with other GP processor(s). In some embodiments, GP processor 210 may access memory 211 via memory bus 212 or via interconnect 260. GP processor can include one or more processor cores, each having one or more levels of dedicated or shared cache (e.g., L1 cache, L2 cache, etc.). GP processor may be any suitable processors capable of executing instructions. For example, in various embodiments, GP processor 210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 210 may commonly, but not necessarily, implement the same ISA.

Memory 211 may store program instructions and/or data accessible by GP processor(s) 210. Program instructions and data correspond to one or more desired functions, depending on the various service(s) being performed by computer system 200. In other embodiments, program instructions and/or data may be received, sent or stored upon different types of computer-accessible media. In various embodiments, system memory 211 may be implemented using any suitable computer-accessible storage medium. Generally speaking, a computer-accessible storage medium may include non-transitory storage media or memory media such as magnetic or optical media, e.g., disk or DVD/CD coupled to computer system 200 via interconnect 260. A non-transitory computer-accessible storage medium may also include any volatile or non-volatile media such as random-access memory (RAM) (e.g., SDRAM, static RAM, dynamic RAM (DRAM), double data rate (DDR) SDRAM, etc.), read only memory (ROM), etc., or other non-volatile memory (e.g., Flash, etc.). Computer-accessible media may include transmission media or signals such as electrical, electromagnetic, or digital signals, conveyed via a communication medium such as a network and/or a wireless link, such as may be implemented via network interface 240. In such cases, computer system 200 may access program instructions and/or data from a remote computer-accessible storage medium via the computer-accessible media.

Network interface(s) 240 may be configured to allow data to be exchanged between computer system 200 and other electronic devices in communication computer system 200 via one or more networks. Such other electronic devices may include other computer systems or hardware within provider system 100 illustrated in FIG. 1, for example. In various embodiments, network interface 240 may support communication via any suitable wired or wireless data network, such as Ethernet (e.g., 802.3), 802.11, IP-based networks, Fiber Channel, Infiniband, and the like. Network interface 240 may support communication via telecommunications/telephony networks such as analog voice networks or digital fiber communications networks any other suitable type of network and/or protocol.

Interconnect(s) 260 coordinates I/O traffic between components of computer system 200, such as GP processor(s) 210, memory 211, network interface(s) 240, and other components coupled to interconnect(s) 260, if present. Interconnect 260 generally facilitates communication by a protocol that controls the timing, sequence, form, and content of data being exchanged amongst components. Example interconnects and protocols include QPI, PCI, USB, SCSI, SAS, ATA, variants or progeny of each, and the like. Multiple interconnects 260 may couple components of computer system 200. For example, some components may be connected with an I2C bus, others with a PCI bus, and others with both the PCI bus and the I2C bus. In some embodiments, bridges relay communications between different types of interconnects (e.g., from one device on a first interconnect, through a bridge, to another device on a second interconnect).

In some embodiments, computer system 200 includes one or more special purpose (SP) processors 220. In embodiments with multiple SP processors 220, each SP processor may have a dedicated bank of memory 221 or may share memory 221 with other SP processor(s). In some embodiments, GP processor 220 may access memory 221 via memory bus 222 or interconnect 260. SP processor 220 might be an accelerator, coprocessor, field-programmable gate array (FPGA), application-specific integrated circuit (ASIC), or other processing device that can offload perform specialized operations (e.g., graphics rendering, encryption and decryption, etc.). In some embodiments, computer system 200 includes more than one type of SP processor.

In some embodiments, computer system 200 includes one or more local storage drives 250. In some embodiments, local storage drives 250 provide block storage via one or more logical volumes to software executing on the computer system 200, including to one or more customer compute instances that may be virtualized on computer system 200. GP processor(s) 210, SP processor(s) 220, and/or other devices (e.g., DMA controllers, etc.) can access local storage volume(s) to store and retrieve code and/or data. Local storage drives 250 generally include non-transitory computer-readable media, such as magnetic disks, optical disks, flash memory devices, phase-change memory devices, RAM, ROM, and the like.

In some embodiments, computer system 200 includes one or more other I/O devices that can store, process, and/or communicate code and/or data for computer system 200.

Computer system 200 includes one or more offload processors 230. In some embodiments, offload processors are at component interfaces to computer system 200. For example, offload processor 230A resides between network interface 240 and interconnect 260, offload processor 230B resides between local storage drive 250 and interconnect 260, and one or more offload processors 230C reside between GP processor(s) 210 and SP processor(s) 220. Although not shown, an offload processor may be included between other I/O devices (if any) and the interconnect 260. In addition to interfacing to interconnect 260, offload processor 230A interfaces to network interface 240 via interconnect 231 that, in some embodiments, is isolated from interconnect 260. Similarly, offload processor 230B interfaces to local storage drive 250 via interconnect 232. Offload processor 230A and network interface 240 may be part of an "offload card" 241 that is connected to the motherboard of the computer system 200 and interfaces to the interconnect 260. Likewise, offload processor 230B may be part of an offload card 251 that includes local storage drive 250.

Offload processor(s) 230 execute offload processor software to enable virtualization of the computer system 200 (e.g., executing customer compute instances) by offloading operations that would otherwise be performed by the other processor(s) in computer system 200 (e.g., GP processors 210). For example, offload processor(s) 230 can coordinate shared resources amongst virtualization instances, such as in situations where multiple customer compute instances may be competing for access to a single device such as network interface 240. Another example is a set of one or more offload processors that act as a proxy to components of the computer system 200, e.g., to enable software executing on GP processor 210 to interact with network interface 240 or local storage drive 250 through offload processors 230A and 230B, respectively. In addition to offloading virtualization management from other processors in computer system 200 to offload processor 230, offload processor(s) 230 can provide inter- and intra-system security to isolate compute instances that may be allocated to different customers and executing on different processors within computer system 200 and to isolate those instances from the remainder of the provider system 100.

In some embodiments, offload processor software includes a hypervisor program to manage compute instances executing on computer system 200. Such management includes pausing and/or un-pausing compute instances, launching and/or terminating compute instances, performing memory transfer/copying operations, etc. In some embodiments, these operations are performed by the offload processor 230B in coordination with a hypervisor (e.g., upon a request from a hypervisor) that is executed by one or more other processors (e.g., 210, 220) of the computer system 200. In other embodiments no hypervisor executes on the other processors (e.g., 210, 220) of the computer system 200. In such embodiments, the hypervisor executed by offload processor(s) 230 can accommodate requests from the other processors.

In some embodiments, program instructions and/or data for offload processor(s) 230 is stored on a memory (not shown) accessible by offload processor(s) 230, similar to how memory 211 stores program instructions and/or data accessible by GP processor(s) 210, as described above.

Computer system 200 may further include a power supply and/or cooling subsystems (not shown). One or more of the processors described above may access a basic input output system (BIOS) or other low-level software program to obtain voltage level(s) output by the power supply, current levels sourced from the power supply, cooling fan speeds, temperature readings, and other environmental conditions.

Computer system 200 may execute a number of different software applications on one or more of the processors, such as GP processor(s) 210, SP processor(s) 220, and offload processor(s) 230. For example, GP processor 210 may execute one or more guest operating systems and application within each guest operating system. Meanwhile, offload processor(s) 230 execute offload processor software. The guest operating system running on GP processor 210 can access some hardware components itself via, e.g., a software driver that is part of the guest operating system, while having to access other hardware components via the offload processor(s) 230 (e.g., local storage drive(s) 250, network interface(s) 240) by virtue of the offload processor residing in the data path between the GP processor 210 and those components. Access via an offload processor 230 is generally transparent to the guest operating system(s). For example, a guest operating system executing on GP processor 210 can initiate a packet transfer via network interface 240 as if it were in communication with a network interface device via interconnect 260, even through traffic between the GP processor 210 and network interface 240 is routed through offload processor 230A. The offload processor software executing on the offload processor(s) 230 may include one or more software processes to act as a proxy for their associated components (e.g., a network interface emulator to permit guest operating system access to network interface 240). Offload processor(s) 230 may have a separate interprocessor communication channel 231.

Figure 3:
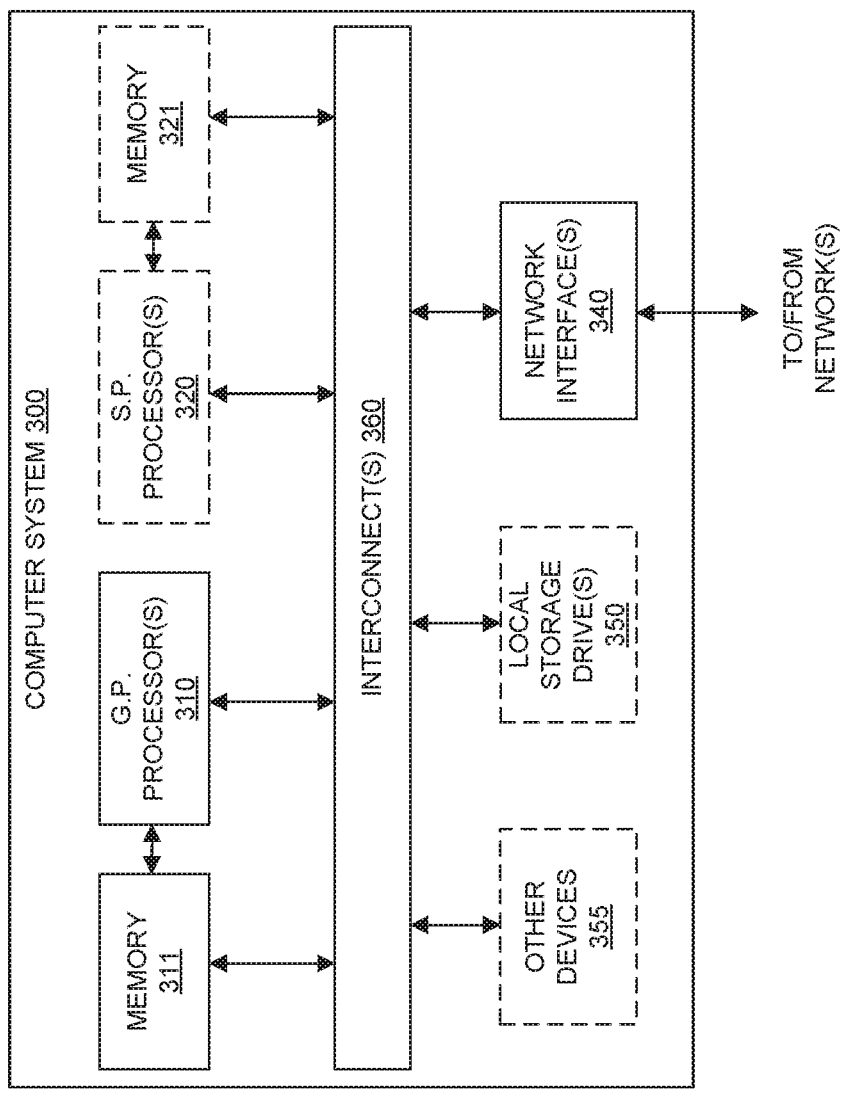
FIG. 3 is a block diagram of another exemplary computer system according to some embodiments.

FIG. 3 is a block diagram of another exemplary computer system 300 according to some embodiments. Embodiments of computer system 300 can correspond to hardware systems in one or more configurations (e.g., 121, 122, 123). Computer system 300 is similar to computer system 200 but does not include offload processor(s) 230 for offloading virtualization functionality from other processors in the computer system 300. Instead, virtualization management (e.g., via a hypervisor program) is executed on one or more of the processor(s) that is also executing the guest operation system(s)/application(s). Computer system 300 may execute a number of different software applications on one or more of the processors, such as GP processor(s) 310 or SP processor(s) 320. For example, GP processor(s) 310 may execute a hypervisor software program that allows virtualization of the computer system 300. The hypervisor software program allows GP processors 310 to execute one or more guest operating systems, each of which may run one or more applications. The hypervisor software controls access to the underlying hardware components in computer system 300 by the guest operating system(s) or their associated application(s). As another example, GP processor(s) 310 may execute a provider operating system supporting one or more applications and providing access to the underlying hardware components in computer system 300.

While FIGS. 2 and 3 depict computer systems with certain components in certain configurations, other computer systems may also be part of hardware systems 120 that do not have configurations like the computer systems in FIGS. 2 and 3. Such devices might include routers, firewalls, deep packet inspection devices, etc. which may not be suitable for general purpose computing but nonetheless have various diagnostics interfaces that can be inspected by the monitoring service. At a basic level, a computer system includes a processor, memory, and one or more I/O devices (e.g., storage drives, network interfaces, etc.).

In addition to computer systems like 300 and 200, provider system 100 can have one or more classes or configurations of hardware systems 120 in which the provider does not have control of portions of the software stack (e.g., in cases where hardware systems are developed by third-parties). Such equipment might include, for example, switches, gateways, firewalls, deep packet inspection devices, and the like. In such cases, the provider may be unable to install custom software on the devices to assist with performance monitoring, discussed below. The third-party equipment, however, may expose some number of performance related metrics to the network operator or provider via the network (e.g., via requests for performance data to a web server executing on the third-party device, or via a management protocol such as simple network management protocol (SNMP), etc.).

Figure 4:
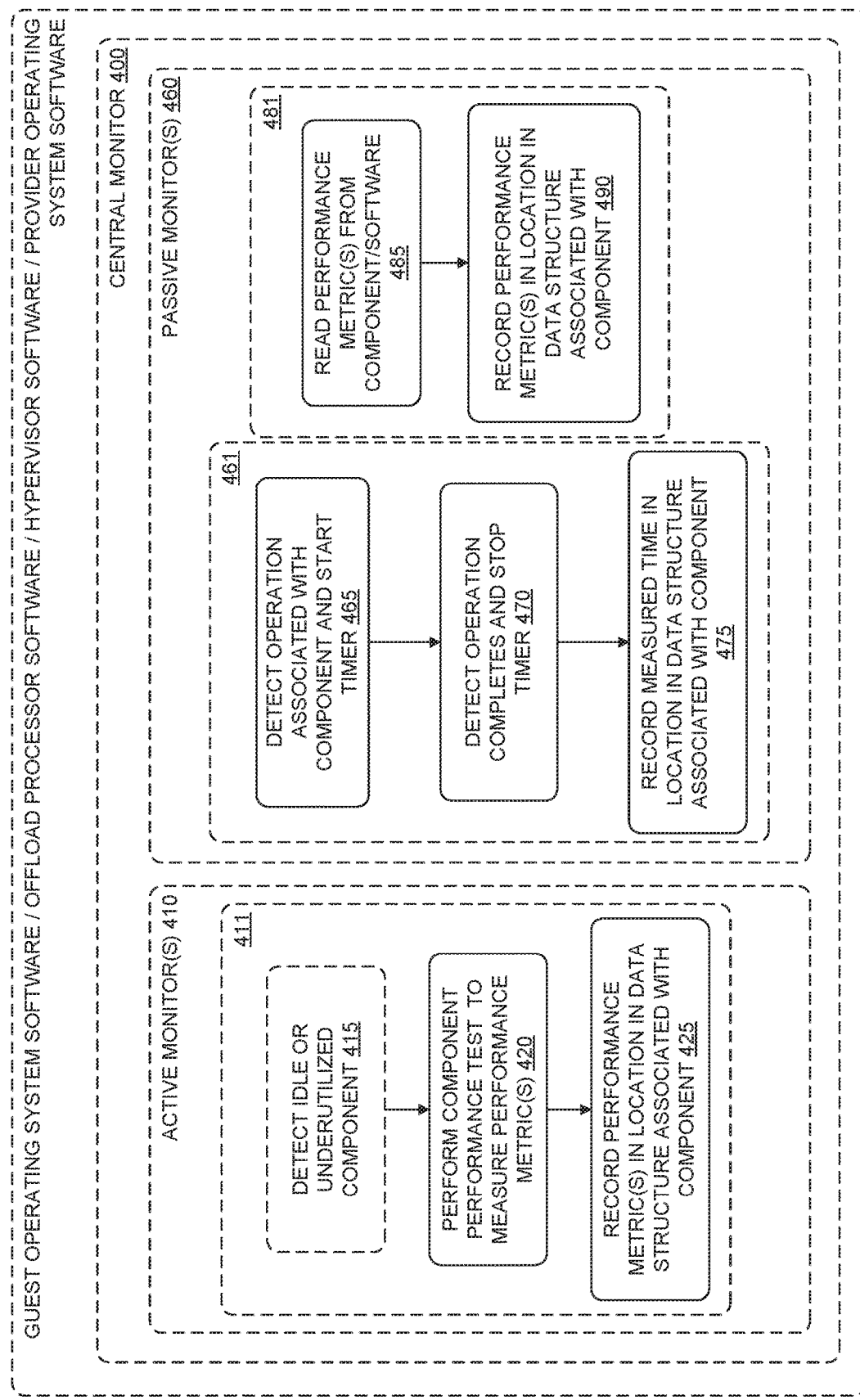
FIG. 4 is a flow diagram illustrating various computer system performance monitoring methods according to some embodiments.

FIG. 4 is a flow diagram illustrating various computer system performance monitoring methods 411, 461, and 481, according to some embodiments. Some or all of the operations in 411, 461, or 481 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations of 411, 461, or 481 are performed by one or more processes that are part of offload processor software executed, hypervisor software, operating system software executing on one or more processors as described elsewhere herein. In some embodiments, a central or master monitor 400 process or software package enables or disables the various monitors 411, 461, and/or 481 and aggregates the measured performance metrics (e.g., by storing performance metrics in memory), and handles communications to and from the system monitoring service 135.

At a high level, methods 411, 461, and 481 can be divided into two groups: active monitor(s) 410 and passive monitor(s) 460. Active monitors 410, represented by exemplary active monitor operations 411, differ from passive monitors 460, represented by exemplary passive monitor operations 461 and 481, in that active monitors 410 interrupt normal system operation to perform test(s) while passive monitors test components during normal system operation. For example, an active monitor may interrupt other customer or provider software transactions with a memory device to store and retrieve test patterns or to test throughput to the memory device.

Because of this interruption, in some embodiments, the operations 411 include, at block 415, detecting idle or underutilized component (e.g., a processor, an I/O device, a memory, etc.). Detecting idle or underutilized component can limit the impact of the active monitor 411 on other software programs executing on system including the component. For example, the software program can monitor processor utilization (or obtain processor utilization metrics from another program). Similarly, the processor can monitor I/O utilization (e.g., across an interconnect 260 or 360, in the aggregate) or to or from a specific component (e.g., local storage drive 250 or 350). Upon detecting that utilization falls below a certain threshold (e.g., 5%, 10%, 25%, etc.), the method proceeds to block 420.

At block 420, the method performs a hardware component performance test to measure one or more performance metrics associated with the component. Different types of tests may be tailored to different components. For example, a program that loops through operations on a small number of values may evaluate the performance of a processor by measuring the time required to complete the program. Larger and larger sets of values may be used to test the processor and its memory hierarchy (e.g., L1 cache, L2 cache, L3 cache, main memory, etc.). A program that addresses certain ranges in memory may test different memory chips, modules, and the like, subject to the memory mapping of the system. As another example, a program might write and read blocks of data to sequential or random addresses in an attached storage volume or drive to measure things like read or write throughput or read or write latency associated with the volume or drive. In some embodiments, if another software program (e.g., a customer of provider program) attempts to access the component being tested while the test is in progress, the monitor may abort the test and return to block 415 to wait for another period of idle time or low utilization.

At block 425, the method records or stores the measured performance metric(s) in a memory for later transfer to the system monitoring service 135. The location of the stored metric(s) may be any of the memories identified in FIGS. 2 and 3 (e.g., memory 211, drive 250, etc.). In some embodiments, the metrics are stored in a data structure like the one described below with reference to FIG. 5. In some embodiments, the measured performance metric(s) are automatically transmitted to the system monitoring service 135 without being stored in a local memory.

The operations of passive monitor method 461 include, at block 465, detecting an operation associated with a component. For example, in embodiments where a hypervisor program is executing on the same processor as a guest operating system, the hypervisor can receive I/O calls directly from the guest operating system. As another example, in embodiments where a hypervisor program is executing on a different processor than the guest operating system, the hypervisor may inspect interconnect traffic to identify transactions between the processor executing the guest operating system and other components within the system. Upon detecting the operation, the passive monitor starts a timer. The timer may be a software process or utilize timing features associated with the processing device performing method 461. For processing operations detected in a multitasking operating system, the timer may be configured to run only when the processor is executing the detected process.

At block 470, the passive monitor detects that the operation completes and stops the timer. The completion of the operation may be detected based on signaling over the interconnect (e.g., when a burst transfer mode terminates), or based on when processes within the operating process complete (e.g., a component driver program returns a successful indicator after completing a write operation to the associated component).

At block 475, the passive monitor records or stores the measured time, which represents a performance metric, in a memory for later transfer to the system monitoring service 135. The location of the stored metric(s) may be any of the memories identified in FIGS. 2 and 3 (e.g., memory 211, drive 250, etc.). In some embodiments, the metrics are stored in a data structure like the one described below with reference to FIG. 5. In some embodiments, the measured performance metric(s) are automatically transmitted to the system monitoring service 135 without being stored in a local memory.

While passive monitor method 461 measures performance based on hardware system operations observable by a hypervisor or operating system, passive monitor method 481 can obtain performance metrics where a component makes performance metrics available at the component interface. For example, a PCIe device might have one or more memory locations that provide performance metrics related to the internal workings of the hardware component that would otherwise be unobservable by the hypervisor or operating system. Such internal workings include, for example, error detection and correction measures within a memory device. Some memory devices might expose metrics related those measures to the hardware system, e.g., via a register storing a count of the number of times a particular error detection or correction scheme was executed. In some embodiments, the component has one or more memory locations that can be programmed with baseline performance metrics as described herein. In such cases, the performance metrics obtained from the component may indicate a number of times the component internally measured a performance metric that failed the baseline performance metric.

The operations of passive monitor method 481 include, at block 485, reading performance metric(s) from the hardware component. The hardware components can include the various components illustrated in FIGS. 2 and 3, as well as others, such as motherboard chipsets, other microcontrollers, and the like. At block 490, the passive monitor records or stores the performance metric(s) in a memory for later transfer to the system monitoring service 135. The location of the stored metric(s) may be any of the volatile or non-volatile memories identified in FIGS. 2 and 3 (e.g., memory 211, drive 250, etc.). In some embodiments, the metrics are stored in a data structure like the one described below with reference to FIG. 5. In some embodiments, the measured performance metric(s) are automatically transmitted to the system monitoring service 135 without being stored in a local memory.

Note that in some embodiments, additional performance metrics related to hardware may be available via other software executing on the same processor as the passive monitor 481. In such embodiments, at block 485, the passive monitor 481 obtains performance metrics from software (e.g., a BIOS application).

The above description associated with FIG. 4 contemplates one or more of monitoring operations 411, 461, and 481 being performed by a process or group of processes that are part of offload processor software, hypervisor software, or operating system software. By incorporating monitoring operations within provider-controlled software, the monitoring operations do not introduce provider-level requirements on the customer or guest operating system. In some embodiments, the provider may have some degree of control or influence over the software included as part of guest operating systems, such that guest operating systems incorporate one or more of monitoring operations 411, 461, and 481 as described herein. For example, if the provider has a default machine image that provides a baseline set of functionalities for its customers, the provider may have incorporated monitoring operations 411, 461, and/or 481 into the image.

Note that in some embodiments of active monitors 410 and/or passive monitors 460, the monitors measure the in-system performance of components. This means that the performance metric represents the overall performance, including latencies associated with transit time associated with the request reaching the component and the response time for the component to respond to the request. For example, if an active monitor 410 is executing on GP processor 310 in FIG. 3 and monitoring operations with local storage drive 350, the measured performance includes latencies associated with the interconnect 360 and with the local storage drive 350. As another example, if a passive monitor 460 is executing on offload processor 230A in FIG. 2 and monitoring operations with network interface 240, the measured performance can include latencies associated with the interconnect 231 and with the network interface 240.

Figure 5:
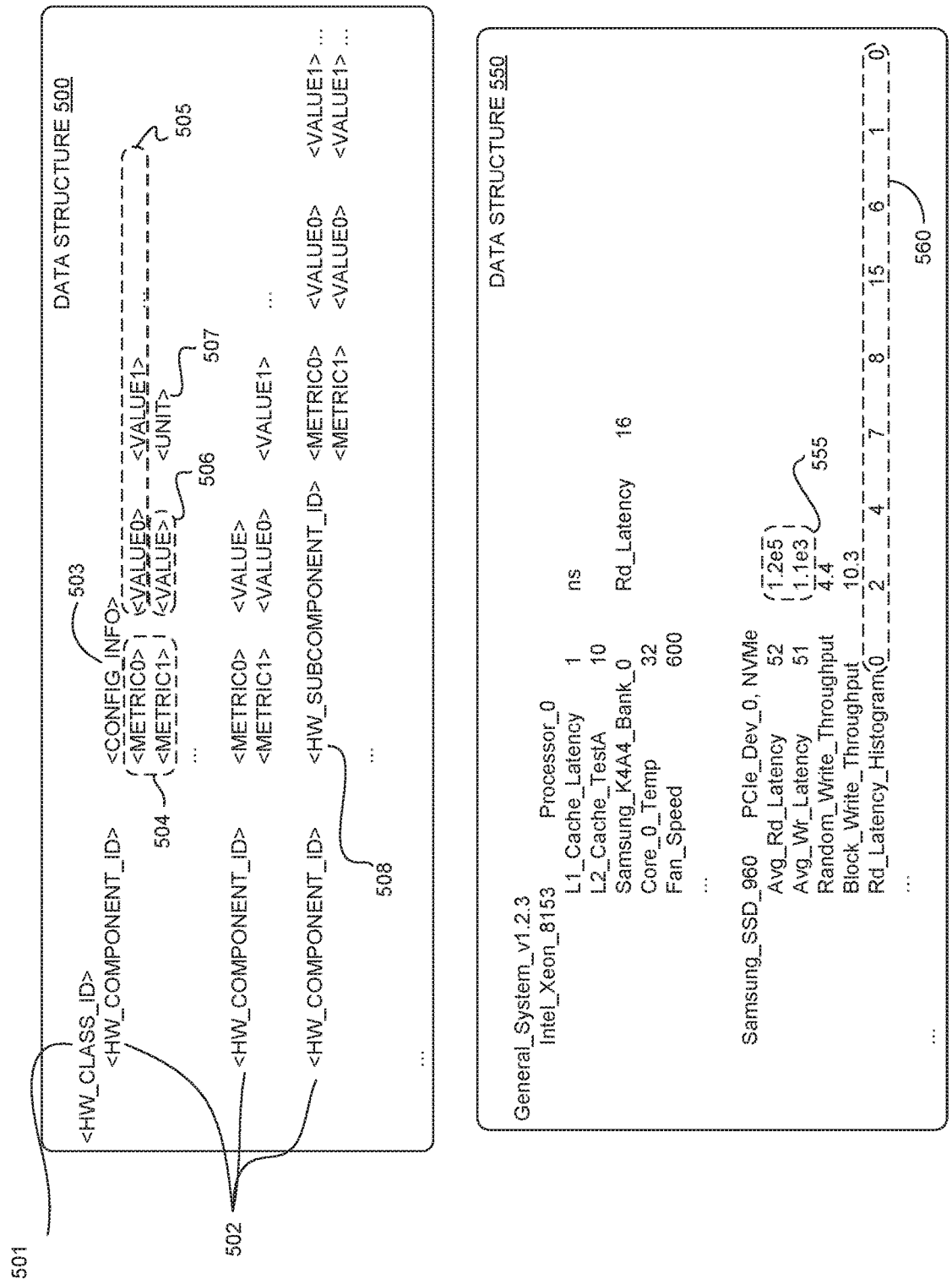
FIG. 5 illustrates an exemplary data structure for storing monitored performance metrics.

FIG. 5 illustrates an exemplary data structure 500 for storing monitored performance metrics. In some embodiments, a parent monitoring process manages reads and writes to data structure 500. Metrics can include latency metrics (e.g., the time between a request to a hardware component and a response from the hardware component), throughput metrics (e.g., how much data the hardware component handles over a fixed amount of time), count metrics (e.g., how often an event associated with the hardware occurs), environment metrics (e.g., temperature, cooling fan speed), and the like. Some metrics may be point-in-time measurements (e.g., the fan speed when the monitor performed the measurement), while others may be an aggregation of samples over time (e.g., an average). The type and number of metrics can vary from hardware component to hardware component. In some embodiments, the local monitoring software transmits data structure 500 or its contents to system monitoring service 135 via one or more networks within provider system 100.

Data structure 500 is a one way to store performance metrics. Data structure 500 includes a class or configuration identifier 501, which may identify a particular hardware system configuration such as hardware systems 121A-121X, 122A-122Y, and 123A-123Z. Data structure 500 includes one or more component identifiers 502 for each monitored component within the system. Some entries in the data structure may include additional configuration information 503 that provides some context for the component within the system. Data structure 500 includes one or more metric identifiers 504, corresponding to the metric(s) being measured by active and/or passive monitors. Some metrics identifiers 504 may identify a metric and the test used to measure it. Each metric identifier 504 includes one or more associated metric values such as metric value 505 or metric values 506. Some metrics may include a unit identifier 507 to indicate the unit of measurement. Due to the hierarchical nature of systems, some hardware components may have subcomponents, which may have subcomponents, and so on. Thus, in some embodiments, data structure 500 can include subcomponent identifier 508 within a component identifier 502. The subcomponent identifier 508 may include further subcomponent identifiers (not shown), and so on.

In some embodiments, the data structure 500 may have a fixed format known to the various entities that access it. In such a case, the key-value pair structure of metric identifiers 504 and metric values 505, 506 can omit the metric identifiers 504.

Data structure 550 is an exemplary data structure for a particular configuration. As shown, hardware configuration "General_System_v1.2.3" includes at least one processor— an Intel® Xeon® 8153 processor as processor_0—and at least one drive—a Samsung® 960 solid-state drive (SSD) as an NVMe device on a PCIe interconnect. In this example, the processor includes a memory subcomponent—a Samsung® K4A4 RAM. Various performance metrics and their corresponding values are included, such as the L1 cache latency of the processor recorded as 1 nanosecond, the read latency of the memory subcomponent at 16 (of some agreed upon unit), a fan speed of 600 (presumably in rotations per minute), etc. The drive includes various performance metrics, such as the average read and write latency with corresponding counts of the number of measurements taken 555, or the multiple values 560 representing a read latency histogram. For example, the first value may represent the number of reads that began to output data between 1 and 10 microseconds, the second value may represent the number of reads that took 11-20 microseconds, and so on. In some embodiments, some or all of the recorded performance metric(s) are reset after being transmitted to the system monitoring service 135.

Figure 6:
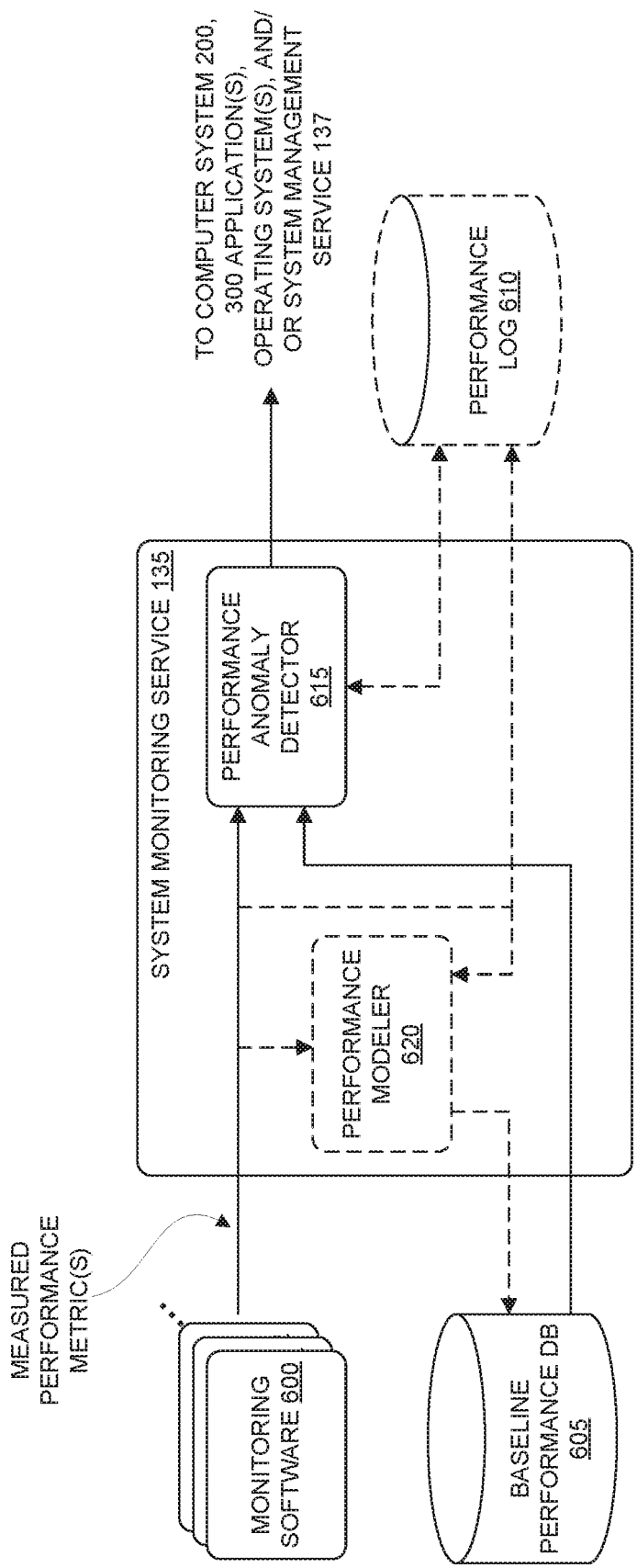
FIG. 6 is a block diagram of an exemplary system monitoring service according to some embodiments.

FIG. 6 is a block diagram of an exemplary system monitoring service 135 according to some embodiments. System monitoring service 135 may be provided using one or more hardware systems 120 within provider system 100. System monitoring service 135 includes a performance anomaly detector 615 and, optionally, a performance modeler 620. System monitoring service 135 obtains performance metrics from the various performance monitors associated with hardware systems 120 throughout provider system 100, such as those described above with reference to FIG. 4. The obtained performance metrics may be fed directly into the performance anomaly detector 615 or stored in a performance log 610 for later processing. Performance log 610 may contain a history of each component of each system within provider system 100.

Performance anomaly detector 615 compares performance metrics obtained from monitors against baseline performance metrics in real-time or occasionally (e.g., periodically, responsive to a schedule) based on performance metrics stored in the performance log 610. In some embodiments, baseline performance metrics are stored in a database 605. When a performance metric fails a check, system monitoring service 135 outputs a message notifying customer software and/or system management service 137 of the failure. Additional details regarding the various comparisons or checks that the performance anomaly detector 615 performs are provided below with reference to FIG. 7.

Baseline performance metrics may be a single value or multiple values. A single baseline performance metric might be a floor (i.e., a minimum) or a ceiling (i.e., a maximum) for a certain performance metric. For example, a cooling fan might have a baseline performance metric of 600 rotations per minute, where any measured performance metric less than that value would indicate the fan is not operating normally and result in a failed check. Baseline performance metrics may also be multiple values, such as two values that define an operating envelope for a component. For example, a voltage regulator may have an optimal output voltage level of 1.2 volts but deemed nominally operable within a range of 1.18 to 1.23 volts. Thus, the baseline performance metric may pass anything in the range of 1.18 to 1.23 volts.

The baseline performance metrics may be established many different ways. For example, timing and performance parameters published as part of a datasheet associated with a hardware component may serve as baseline performance metrics for a component's performance. For example, the minimum advertised read latency on a hardware component datasheet can be used as a baseline performance metric for a test or measurement that checks read latency of that hardware component in a hardware system.

There are certain cases where datasheet parameters may not reflect in-system performance or be inadequate for use in performance checks. For example, the environment in which a particular hardware component operates may impact its performance. If one class of systems (e.g., 121) supports a hardware component feature that another class of systems (e.g., 122) does not, the measured performance metric(s) associated with that hardware component will vary from one class to another. In other cases, a measurable performance metric may not have a corresponding datasheet parameter. In these cases, performance modeler 620 may empirically determine baseline performance metrics. Additional details regarding the operations of performance modeler 620 are provided below with reference to FIG. 7.

Figure 7:
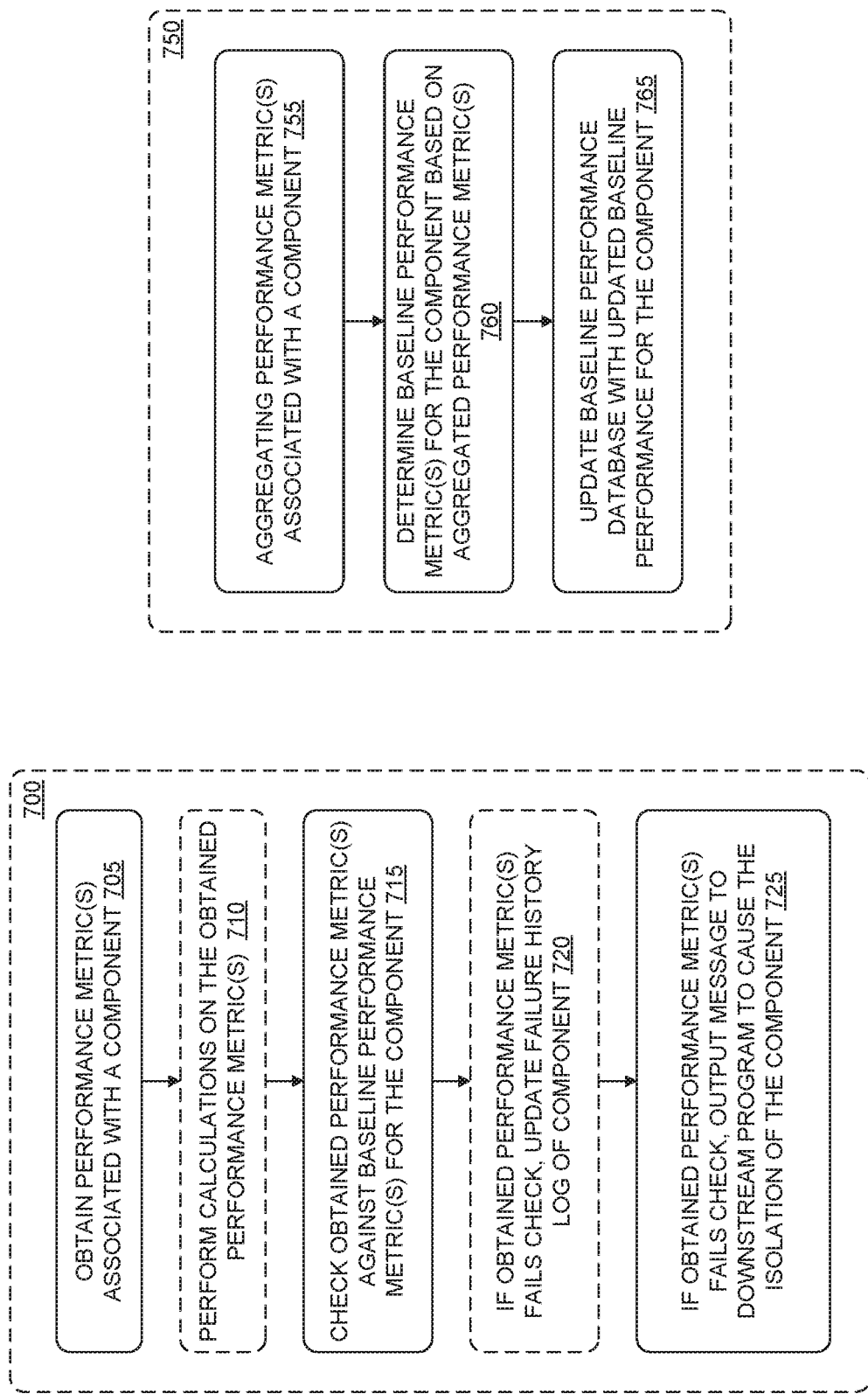
FIG. 7 is a flow diagram of operations of methods performed by the system monitoring service according to some embodiments.

FIG. 7 is a flow diagram of operations 700 and 750 of methods performed by the system monitoring service according to some embodiments. Some or all of the operations 700, 750 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by system monitoring service 135 of the other figures.

The operations 700 include, at block 705, obtaining one or more performance metrics associated with a component in a system. In some embodiments, the various component monitoring processes (or a parent monitoring process associated with a system) throughout the provider system 100 occasionally report, or "push," results to system monitoring service 135. For example, an active or a passive monitor might transmit measured performance metric(s) to the system monitoring service 135 when a certain number of metric(s) have been measured (e.g., 1, 10, 100, etc.), according to a schedule (e.g., once per hour), or when a local buffer or memory storing performance metrics becomes full or close to full. In other embodiments, system monitoring service 135 might request performance metrics from the various monitoring processes throughout the provider system 100. In some embodiments, system monitoring service 135 sends a request for performance metrics to a monitor process or a parent monitoring process via a network, and the monitor process or parent monitoring process responds by transmitting the performance metric(s) to the system monitoring service 135 via the network. Similarly, third-party software and/or devices within provider system 100 may be polled or occasionally transmit performance data to the system monitoring service 135. In some embodiments, all of the performance metrics for a particular hardware system are obtained by the system monitoring service 135 (e.g., by receiving data representative of all the performance metrics associated with the hardware system). The obtained metric(s) may be considered by subsequent operations as they arrive or stored in performance log 610 for later evaluation.

In some embodiments, the operations 700 include, at block 710, performing calculations on the obtained performance metric(s). Such an operation may be skipped if the received performance metric(s) are in a form comparable to the baseline performance metric(s). For example, if the received performance metric is a plurality of measurements of some latency within a hardware system and the baseline performance metric is an average with upper and lower bounds, system monitoring service 135 would first compute the average of the received performance metrics.

The operations 700 include, at block 715, checking the obtained (or calculated at 710) performance metric(s) against the baseline performance metrics for the component. As mentioned above, baseline performance metric(s) may reflect a standalone performance parameter of a component (e.g., from a datasheet) or may reflect the in-system performance (e.g., as measured). Performance anomaly detector 615 checks the obtained performance metrics against the available baseline performance metrics (e.g., standalone and/or in-system) to evaluate whether the component could be experiencing a non-fatal issue. In some embodiments, the check is a comparison of the obtained performance metric to the baseline performance metric (e.g., greater than, less than, within a range, etc.).

Not all of the obtained performance metrics may be checked. For example, certain baseline performance metrics may be flagged with a valid/invalid indicator. The invalid indicator may be used to flag performance tests that are not well characterized (e.g., during the deployment of a new monitor process), that should not result in failures due to limited availability of spare resources, and the like.

Should the check at block 715 fail, in some embodiments the operations 700 include, at block 720, updating a failure history log of failures associated with the component when the check at block 715 fails. Each entry in the log may correspond to a count of the number of failures of a particular performance metric for a particular component within the provider system 100 (e.g., test X of component Y in system Z: 10 failures). In some embodiments, these entries are stored within performance log 610.

Should the check at block 715 fail, in some embodiments the operations 700 include, at block 725, outputting a message to a downstream program or service to cause the isolation of the component or system in which the component resides. In some embodiments, isolation of the component entails moving any operational software processes (e.g., of a customer or the provider) away from the component or system that failed the check. The message can include an identity of the component, an identity of the system in which the component resides, a network address of the system, or the like. In some embodiments, the downstream program or service is system management service 137.

In some embodiments, the outputting the message is contingent on some number of failures in the failure history log. For example, two, three, four, etc. failures must occur before the message is output. This can reduce the impact of spurious failures that are the result of random events unrelated to component failure. To further limit the number of spurious events that might trigger an output message, in some embodiments the failures must all occur within some period of time (e.g., a day). In some embodiments, each failure may be recorded along with a time stamp of when the failure occurred such that when a certain number of failures occur within a window of time, the message is output. In some embodiments, a counter representing the total number of failures associated with the component is incremented each time a failure occurs. When the counter reaches a certain threshold, the message is output. To avoid outputting a message when the cumulative number of failures over a long period of time reach the threshold, the counter may decay over time (e.g., decrement the counter by 1 every day, hour, week, etc.).

In some embodiments, one or more (or all) of the operations 750 are performed by system monitoring service 135 of the of the other figures. These operations may be useful for setting or identifying baseline performance metrics that are empirically determined. Thus, operations 750 can be used to characterize the in-system performance of a component or of a new or updated monitoring process within provider system 100. Operations 750 may be further used where specified performance parameters (e.g., in a datasheet) are too loose of a measure to gauge non-fatal hardware degradation, such as when the performance of a population of components is well within a specified limit but degrades toward the specified limit over time.

The operations 750 include, at block 755, aggregating performance metrics associated with a component in a system. The aggregation involves obtaining performance metric(s) for a particular component, similar to that described above with reference to block 705. However, in addition to obtaining performance metric(s) for a particular component, at block 755, system monitoring service 135 obtains performance metrics from a monitor or test associated with a given class of components throughout provider system 100. For example, system monitoring service 135 might collect a read latency measured by an active monitor associated with a particular memory component within each of hardware systems 121A-121X. As another example, system monitoring service 135 might collect the read latency regardless of the upper level hardware system (e.g., the same SDRAM component used in multiple different hardware configurations). The obtained metrics may be considered by subsequent operations once they are aggregated or stored in performance log 610 for later evaluation.

The operations 750 include, at block 760, determining baseline performance metric(s) for the component based on the aggregated performance metrics. In some embodiments, this determination is a two-stage process where the aggregated performance metrics are statistically analyzed and then configuration parameters are applied to the results of the analysis to specify the baseline performance metric. For example, the performance modeler 620 can calculate the mean and standard deviation of a population of performance metrics. The mean and standard deviation can be used to set a range, minimum, or maximum for the performance metric (e.g., mean+/−standard deviation(s)). In some embodiments, the provider sets a configuration parameter to adjust the result. The configuration parameter may be based on a variety of factors, including the resulting impact on the provider system 100 should the component fail, the number of available backup components or systems within the provider system 100, the ease with which the component can be repaired or replaced within the provider system 100, and other similar variables. The range, minimum, or maximum (before or after adjustment) acts as a baseline performance metric for that component. In some embodiments, the provider further adjusts the baseline performance metric for different applications or workloads. For example, the provider could adjust the baseline performance metric for high, medium, and low performance applications. A hardware system instantiated with a real-time web service might be checked using the high-performance baseline performance metric, while a scientific computing batch job might be checked using the low-performance baseline performance metric.

In some embodiments, baseline performance metrics are modeled as service level agreements, with the various components within any given hardware system 120 acting as service providers within a distributed service architecture that spans an individual hardware system.

The operations 750 include, at block 765, updating the baseline performance database 605 with the determined baseline performance metric for the component-metric- or component-metric-system-tuple. Note that in some embodiments such as the one illustrated in FIG. 8, operations performed by the performance anomaly detector 615 are distributed amongst hardware systems 120. As a result, baseline performance database 605 represents a distributed database, where the updated baseline performance metrics, as determined by the performance modeler 620, are distributed to hardware systems 120.

Figure 8:
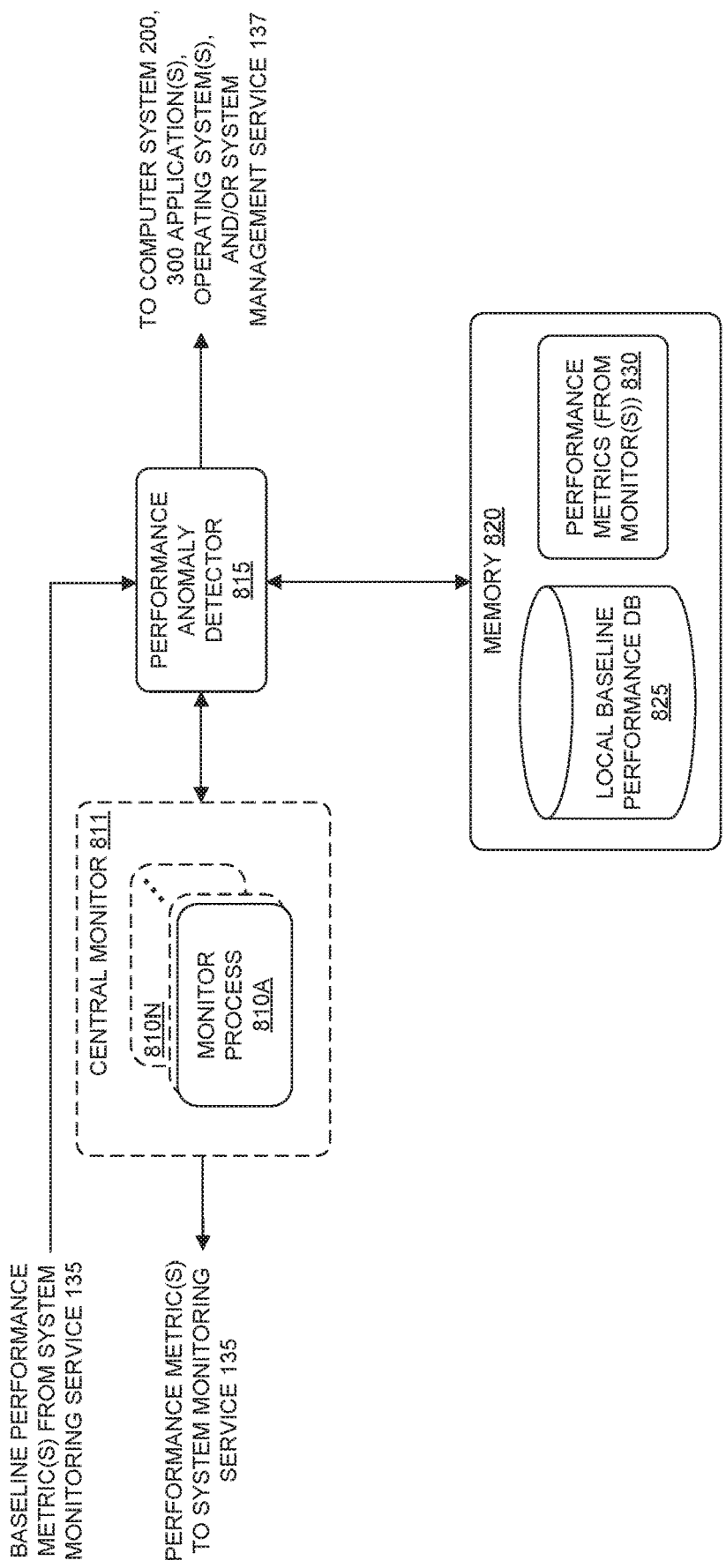
FIG. 8 illustrates an alternative arrangement of certain monitoring operations according to some embodiments.

FIG. 8 illustrates an alternative arrangement of certain monitoring operations according to some embodiments. At a high level, the operations of performance anomaly detector 615 of FIG. 6 are localized to hardware systems 120. Thus, rather than a centralized system monitoring service 135 making determinations of whether certain components are exhibiting degraded performance, those determinations are made by software executing in the hardware systems (e.g., a distributed system monitoring service). Performance anomaly detector 815 may be part of offload processor software, hypervisor software, or operating system software. As explained above, offload processor software, hypervisor software, and operating system software are software programs executing on computer systems like those depicted in FIGS. 2 and 3. FIG. 8 further illustrates one or more monitor processes 810A-810N performing operations such as those described above with reference to FIG. 4. In some embodiments, a central monitor 811 manages monitor processes 810A-810N.

Memory 820 may be one or more of the memories illustrated in FIG. 2 or 3 (e.g., memory 211, local storage drive(s) 250) or some other memory (e.g., a memory accessible by the offload processor(s) 230). Memory 820 includes a local baseline performance database 825, which stores baseline performance metrics related to components within the system (e.g., 200, 300). In some embodiments, the baseline performance metrics are received from system monitoring service 135 (e.g., from performance modeler 620). Memory 820 also includes performance metrics 830, which are the values obtained from monitor processes 810A-810N. In some embodiments, performance metrics 830 are stored in a form similar to that illustrated in FIG. 5.

The operations of performance anomaly detector 815 are largely similar to the operations of performance anomaly detector 615 as described with reference to operations 700 with the understanding that at block 705, rather than remotely collect performance metrics from hardware systems 120 via provider networks 125, performance anomaly detector 815 obtains performance metrics locally from other processes that are part of offload processor software, hypervisor software, or operating system software (e.g., from monitor processes 810A-810N).

Figure 9:
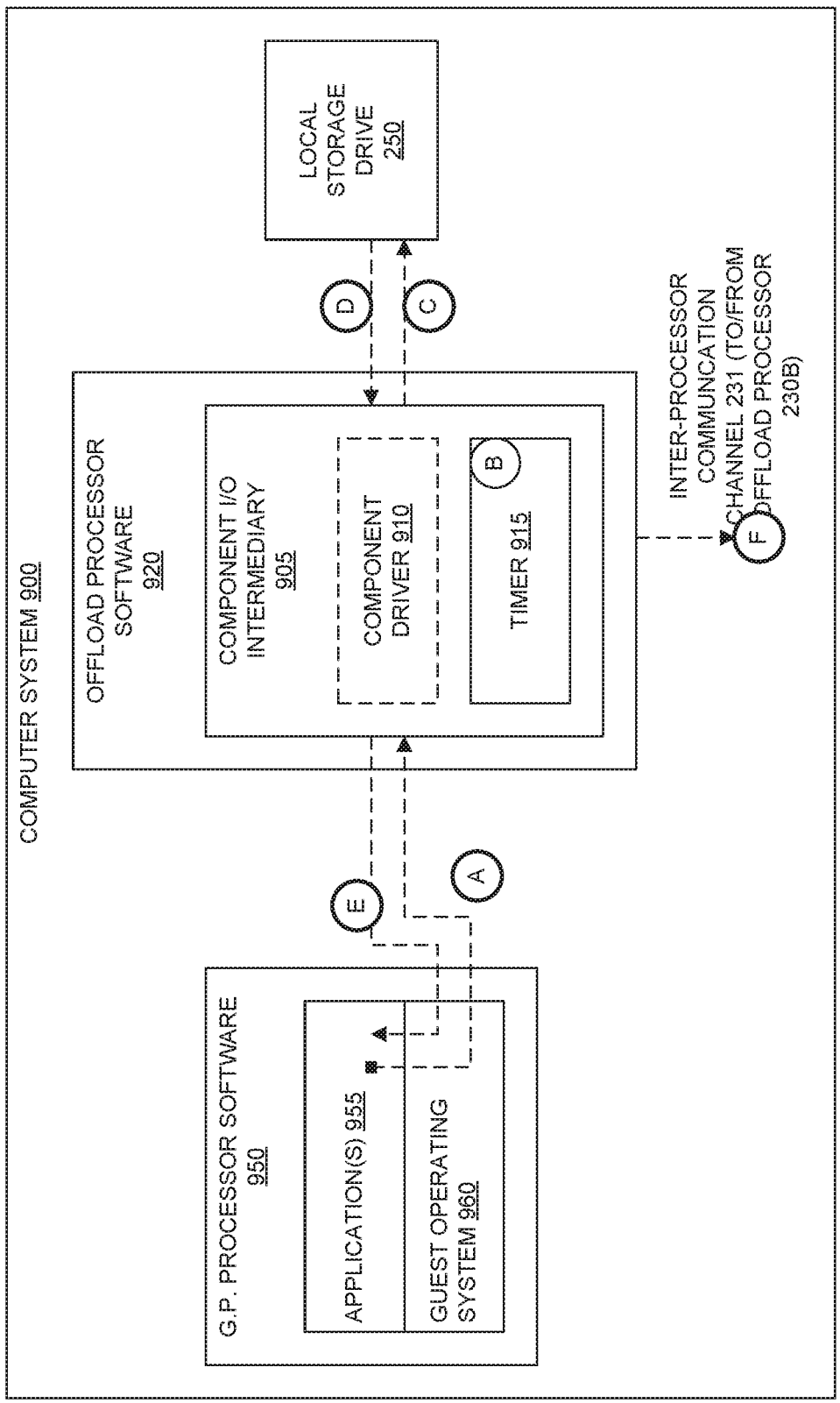
FIGS. 9 through 11 illustrate exemplary computer systems including component input/output intermediaries according to some embodiments.
Figure 10:
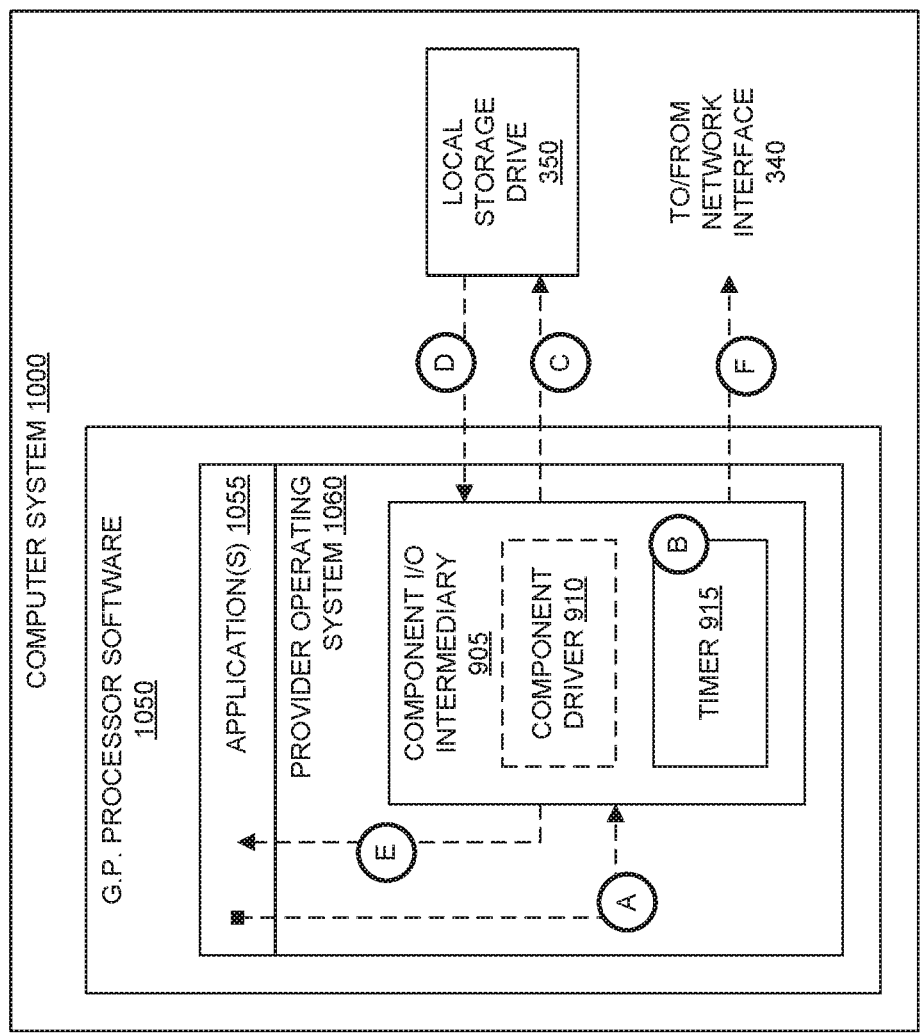
Figure 11:
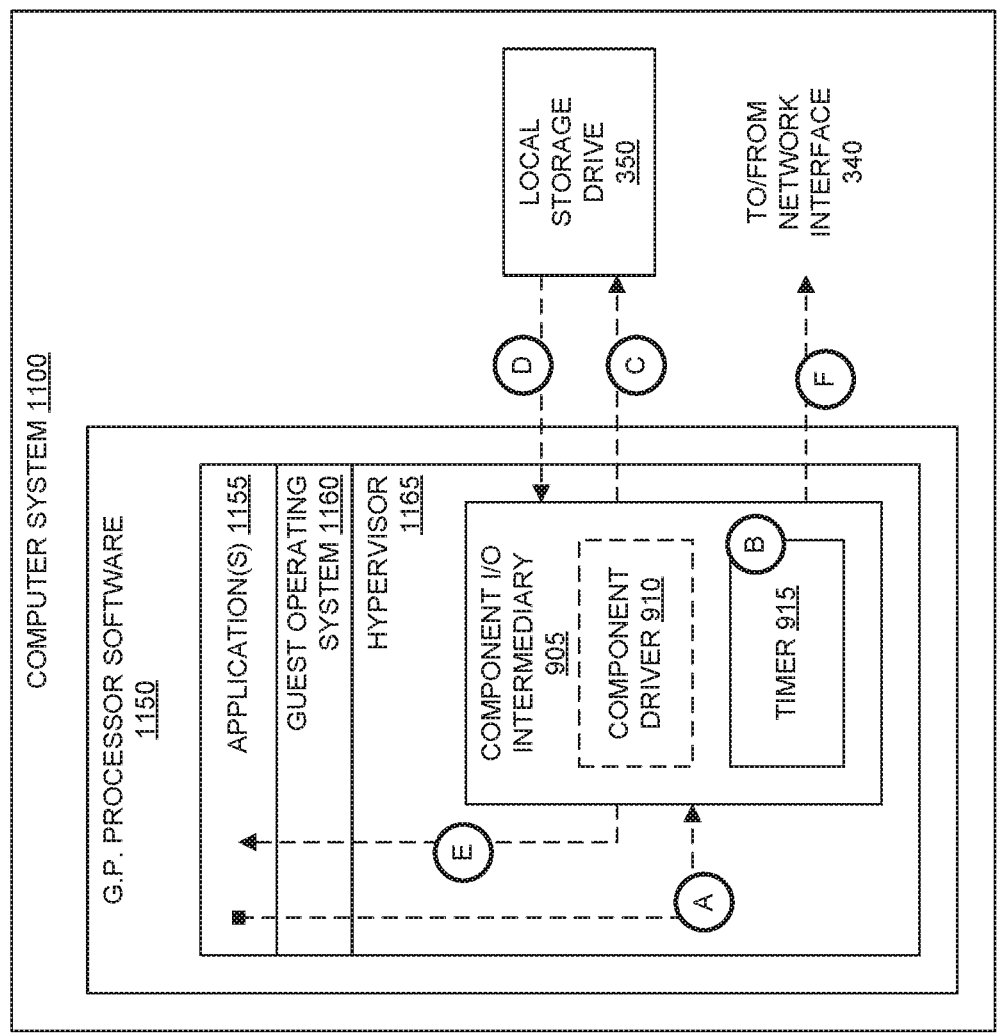

FIGS. 9 through 11 illustrate exemplary computer systems including component input/output intermediaries (CIOI) according to some embodiments. At a high level, CIOI 905 receives or intercepts messages or calls from an operating system to a device, such as an I/O device, and generates a quick failure when the device exhibits abnormal or degraded performance In this manner, a CIOI converts delayed or slow operations with a device into failures. Often multiple CIOIs will exist within a given computer software system, each monitoring operations with different devices within the system.

FIG. 9 illustrates an exemplary computer system 900 including a component input/output intermediary (CIOI) 905 according to some embodiments. Computer system 900 is based on computer system 200 and includes GP processor software 950 (executed by GP processor(s) 210), offload processor software 920 (executed by offload processor(s) 230), and local storage drive 250. GP processor software 950 includes guest operating system 960 and application(s) 955. Offload processor software includes CIOI 905. CIOI 905 includes a timer 915 and, in some embodiments, a component driver 910 for local storage drive 250 (or some other component offload processor controls access to for GP processor 210).

In addition, interconnect 260 couples GP processor 210 to offload processor 230A, and interconnect 232 couples offload processor 230A to local storage drive 250.

As indicated by the circle labeled "A" in FIG. 9, guest operating system 960 originates a request to local storage drive 250 (or receives a request from an originating application 955) and sends the request to local storage drive 250 (e.g., via interconnect 260). Because offload processor 230B is in the data path between GP processor(s) 210 and local storage drive 250, offload processor software 920 receives the request. In some embodiments, offload processor software 920 acts as a proxy for local storage device (e.g., includes an interface emulator) such that GP processor 210 behaves as if it is directly communicating to local storage device 250 even though it is communicating with offload processor 230B. In response to receiving the request, CIOI 905 starts timer 915 as indicated by circle B. CIOI 905 sends the request to local storage drive 250 (e.g., via interconnect 232) as indicated by circle C. If local storage drive 250 is operating nominally, local storage drive 250 responds to the request before timer 915 indicates local storage drive 250 is exhibiting degraded performance, and CIOI 905 relays a response from local storage drive 250 (circle D) to the originator of the request (circle E). If local storage drive 250 is not operating nominally, timer 915 indicates as such, and CIOI 905 sends an error message to the originator of the request as indicated by circle E before receiving a response from local storage drive 250 at circle D. In this manner, from the perspective of the operating system 960, the operation with local storage drive 250 has completed by returning an error. In some embodiments, when CIOI 905 determines that local storage drive 250 is not operating nominally, CIOI 905 sends an error message via inter-processor communication channel 231 to another offload processor with access to a network interface. In this manner, CIOI 905 may send an error message to another networked component, such as system monitoring service 135 or system management service 137, as indicated by circle F.

FIG. 10 illustrates another exemplary computer system 1000 including a component input/output intermediary 905 according to some embodiments. Computer system 1000 is based on computer system 300 and includes GP processor software 1050 (executed by GP processor 310) and local storage drive 350. GP processor software 1050 includes provider operation system 1060 and application(s) 1055. Provider operating system 1060 includes CIOI 905. CIOI 905 includes a timer 915 and, in some embodiments, a component driver 910 for local storage drive 350.

As indicated by the circle labeled "A" in FIG. 10, provider operating system 1060 originates a request to local storage drive 250 (or receives a request from an originating application 1055). CIOI 905 receives the request and, in response, starts timer 915 as indicated by circle B. CIOI 905 sends the request to local storage drive 350 (e.g., via interconnect 360) as indicated by circle C. If local storage drive 250 is operating nominally, local storage drive 350 responds to the request before timer 915 indicates local storage drive 350 is exhibiting degraded performance, and CIOI 905 relays a response from local storage drive 350 (circle D) to the originator of the request (circle E). If local storage drive 350 is not operating nominally, timer 915 indicates as such, and CIOI 905 sends an error message to the originator of the request as indicated by circle E before receiving a response from local storage drive 350 at circle D. In this manner, from the perspective of provider operating system 1060, the operation with local storage drive 350 has completed by returning an error. In some embodiments, when CIOI 905 determines that local storage drive 350 is not operating nominally, CIOI 905 sends an error message via network interface 340 to another networked component, such as system monitoring service 135 or system management service 137, as indicated by circle F.

FIG. 11 illustrates another exemplary computer system 1100 including a component input/output intermediary 905 according to some embodiments. Computer system 1100 is based on computer system 300. With the exception of CIOI 905 in FIG. 11 being part of the hypervisor 1165, the flow of circles A through F in FIG. 11 is similar to the flow described above for FIG. 10. Note that in this example, hypervisor 1165 acts as a proxy to the various components, including local storage drive 350.

Although FIGS. 9 through 11 illustrate the CIOI intermediating communications with local storage drive 250, 350, CIOI may act as an intermediary between request originators and other request targets, including those illustrated in FIGS. 2 and 3. For example, additional CIOI processes may intermediate communications between the request originators and memory 211, 311, SP processor(s) 220, 320, memory 221, 321, network interfaces 240, 340, other I/O devices 255, 355, and other components not specifically illustrated in FIGS. 2 and 3.

Figure 12:
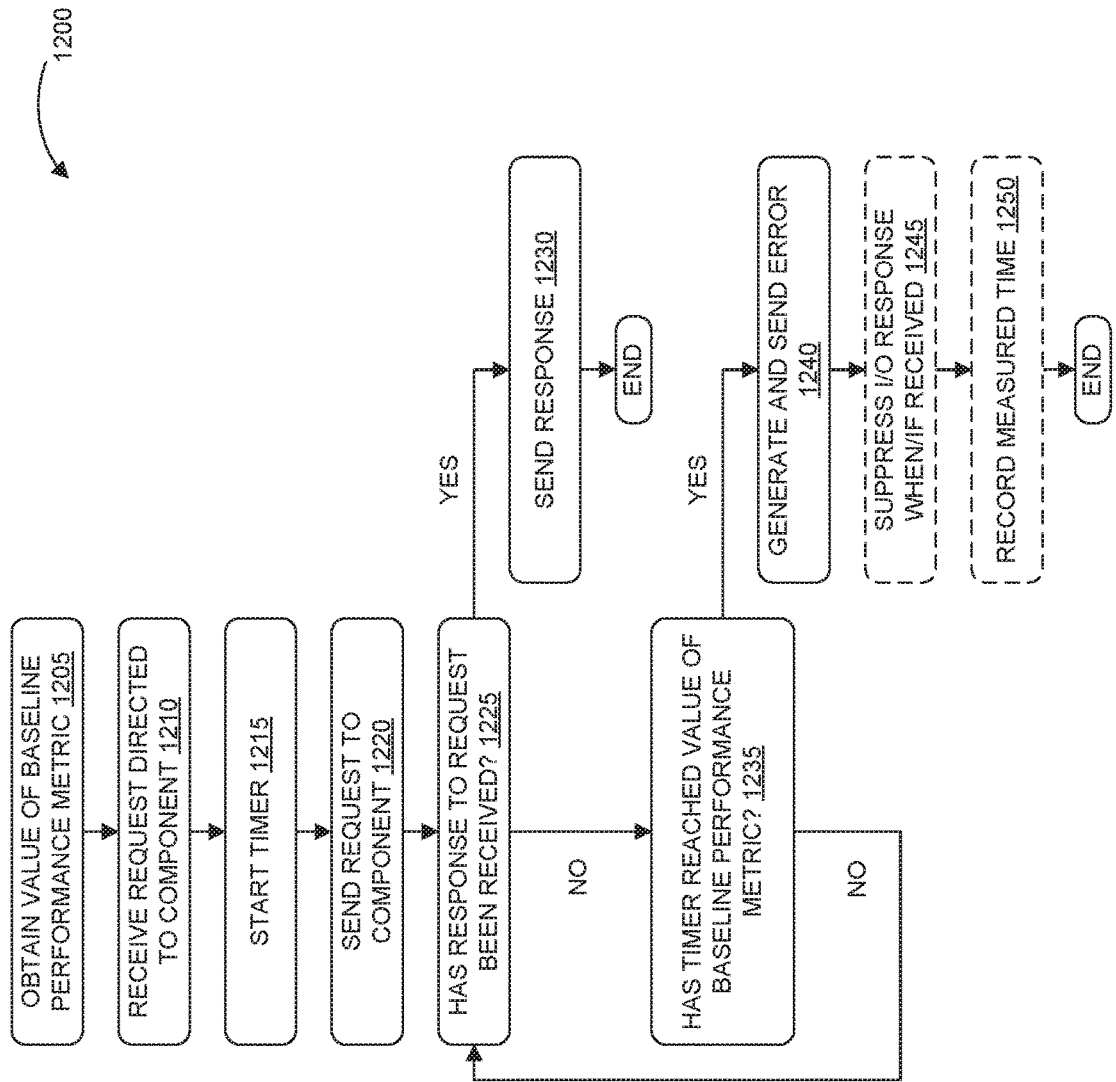
FIG. 12 is a flow diagram of operations of a method performed by the component input/output intermediary according to some embodiments.

FIG. 12 is a flow diagram of operations 1200 of a method performed by the CIOI 905 according to some embodiments. Some or all of the operations 1200 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1200 are performed by CIOI 905 of the other figures.

The operations include, at block 1205, obtaining a baseline performance metric for the relevant component. The CIOI 905 may obtain the baseline performance metric from system monitoring service 135. For example, if CIOI 905 is monitoring the performance of a block storage device (e.g., local storage driver 250), the baseline performance metric might be the maximum latency between issuing a read command and receiving the first block of data. While only a single baseline performance metric is used in this example, CIOI 905 may monitor the component's performance against a variety of baseline performance metrics, one or more of which may be updated as the system monitoring service 135 updates baseline performance metrics.

The operations include, at block 1210, receiving a request directed to a component, such as an I/O component. As indicated in FIGS. 9 through 11, the request might originate from a software component executing as part of a user application or an operating system. In embodiments where CIOI 905 is executing on the same processor as the operating system, such as in computer system 1000 or 1100, the request might be received in the form of a system call to a storage, networking, processing, or other operating system component that is a library, API, or other interface between software and hardware. For example, a request might be to a storage drive by way of a file system API provided by the operating system. As another example, a request might be to network interface by way of a sockets API provided by the operating system. In embodiments where CIOI 905 is not executing on the same processor as the operating system, such as on an offload processor 230 in computer system 900, the is generally a transaction over an interconnect coupling the processors, such as interconnect 260. For example, GP processor 210 might initiate a PCIe transaction to a network device over interconnect 260 which is received by offload processor 230A. Acting as a proxy to the network device, offload processor 230A receives the PCIe transaction that includes the request to the network device.

The operations include, at block 1215, starting a timer and, at block 1220, sending the received request to the component. In some embodiments, the request is sent to a driver API associated with the component, such as component driver 910.

The operations include, at block 1225, checking whether the component has responded to the request. If the component has responded, operations continue to block 1230, where CIOI 905 sends the response to the upstream entity making the request received at block 1210. The response may be a return value to the calling function (e.g., if CIOI 905 is executing on the same processor as the operating system) or an acknowledgment or other responsive transaction over an interconnect (e.g., if CIOI 905 is not executing on the same processor as the operating system).

If, however, no response has been received from the component, operations continue to block 1235, where CIOI 905 checks whether the elapsed time based on the timer initiated at block 1215 has met or exceeded the value of the baseline performance metric. If not, operations continue to block 1225, with some optional delay. If, however, the timer has reached or exceeded the value of the baseline performance metric, operations continue to block 1240. At block 1240, CIOI 905 generates and sends an error message.

In embodiments where the CIOI 905 is executing on the same processor as the operating system such as computer system 1000 or 1100, the error message may include an error code, such as a Portable Operating System Interface (POSIX) error code that CIOI 905 returns to the calling process. In embodiments where the CIOI 905 is not executing on the same processor as the operating system such as computer system 900, the error message may be part of a transaction over an interconnect that CIOI 905 initiates to respond to the processor executing the operating system. In addition to or in place of reporting the message to the operating system, CIOI 905 may report the error or "timeout" of the request elsewhere. In some embodiments, CIOI 905 sends the error message to central monitor 400 or 811 in a manner similar to the monitoring processes described herein to record the failure of the request to the device for reporting to the system monitoring service 135. In other embodiments, CIOI 905 sends the error message to system monitoring service 135 or system management service 137.

Sometimes the component will provide a response outside of the baseline performance metric limit. In such cases, operations continue to block 1245. At block 1245, CIOI 905 may receive and suppress the delayed response given the error already issued at block 1240. Further, at block 1250, CIOI 905 may record the measured time for later reporting to the system monitoring service 135, as was the case with monitoring method 461.

In some embodiments, some of the operations 1200 are performed at the component-level. For example, a component controller might include an interface to receive baseline performance metrics such as those characterized for the component by the system monitoring service 135. Exemplary component controllers are a memory controller (e.g., integrated with memory 211) a network interface controller (e.g., integrated with network interface 240) or a drive controller (e.g., integrated with local storage drive 250). The component controller monitors whether the time required to respond to an operation exceeds the baseline performance metric for that operation and, if so, returns an error.

Figure 13:
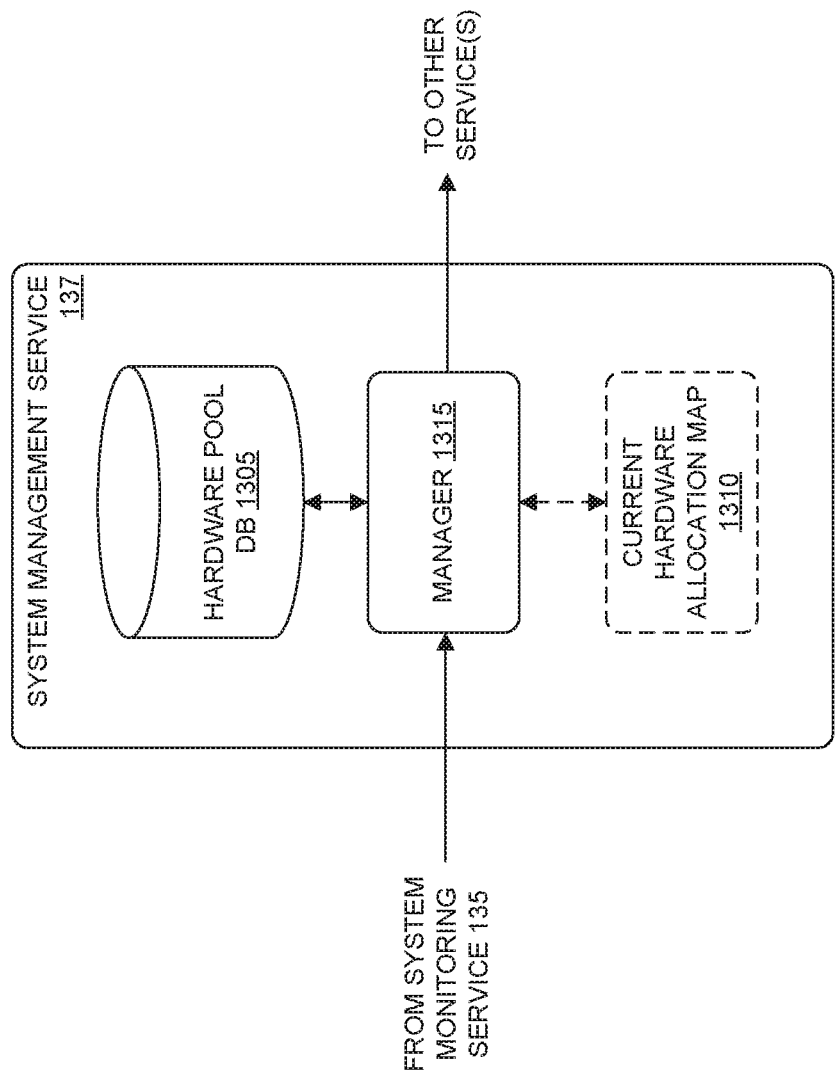
FIG. 13 is a block diagram of an exemplary system management service according to some embodiments.

FIG. 13 is a block diagram of an exemplary system management service 137 according to some embodiments. System management service 137 includes hardware pool database 1305, manager 1315, and current hardware allocation map 1310. System management service 137 receives messages from system monitoring service 135 (or other sources as described herein) and sends messages to one or more other services within provider system 100. In some embodiments, system management service 137 is an internal service 133 executed by one or more hardware systems 120.

Manager 1315 allocates hardware systems 120 depending on software services and applications 130 operating requirements. These requirements are often dynamic in nature, depending on the number and type of internal and external services that are executing within provider system 100 and on varying customer demands (e.g., customer software executing on compute instances and using storage resources, etc.). For example, a customer might request a compute instance having a certain number of processors and memory from an external service 131, which, in conjunction with one or more internal services 133, including system management service 137, causes the provider system 100 to assign one of the configuration 1 hardware systems 121 to the user.

In one embodiments, hardware pool database 1305 contains a listing of all of the available hardware systems 120 within provider system 100. In other embodiments, hardware pool database 1305 contains a listing of all of the available slots for different types of instances. For example, a hardware system including four processors might correspond to four single-processor compute instance slots. The listing of hardware systems or instance slots may be updated when the provider makes changes to provider system 100 (e.g., by adding or removing equipment). When a software service or application has a new requirement, mapper 1315 consults the hardware pool database 1305 to identify system or slot that meets the requirement, removes the identified system or slot from the hardware pool database 1305 (or causes it to be flagged as unavailable), and updates current hardware allocation map 1310 to associate the assigned system or slot with the software service or application that made the request.

In some embodiments, the functions of system management service 137 described above carried out by applications that are part of a control plane of provider system 100.

In some embodiments, hardware pool database 1305 contains a list of all available hardware systems 120 (e.g., "slots" of server computing devices that can host a particular type or types of VMs). Thus, when manager 1315 receives a request to allocate a hardware system 120, manager 1315 can select a hardware system that meets the requirements of the request and is within the hardware pool database 1305, possibly without consulting current hardware allocation map 1310.

Figure 14:
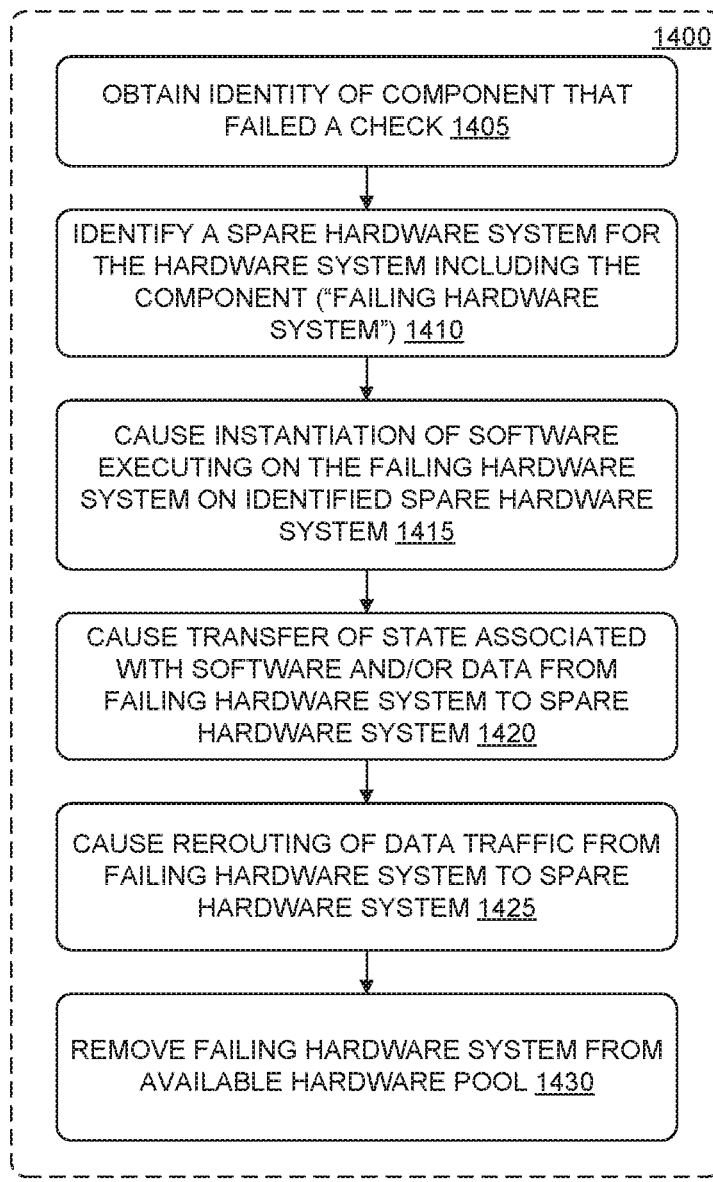
FIG. 14 is a flow diagram of operations of a method performed by the system management service according to some embodiments.

FIG. 14 is a flow diagram of operations 1400 of a method performed by the system management service 137 according to some embodiments. Some or all of the operations 1400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1400 are performed by mapping service 137 of the other figures.

The operations 1400 include, at block 1405, obtaining the identity of a hardware component that failed a check. The identity may arrive as part of a message from system monitoring service 135 (see FIG. 6) or from a hypervisor or operating system executing on a computer system 200, 300 (see FIG. 8). The component may be uniquely identified with a part number assigned by a manufacturer or by the provider that identifies a specific component or a class of components (e.g., a type of processor), a network address identifying the location of the component within provider system 100, some other identifying information, or some combination thereof. In some embodiments, the obtained identity may be of a hardware system that includes a component that failed a check without identifying the component itself.

At block 1410, the operations 1400 further include identifying a spare hardware system to serve as a substitute for the hardware system that included the component that failed the check (i.e., a failing hardware system). In some cases, system management service 137 identifies the spare hardware system by first checking for other hardware systems of the same configuration as the failing hardware system and, if one is unavailable, checking for another hardware system within the same class as the failing hardware system. For example, if the failed component is a component of configuration 1 hardware system 121A, system management service 137 may identify a configuration 1 hardware system 121B (not shown in FIG. 1) as the spare system, but if no other configuration 1 hardware system was available, identify a configuration 2 hardware system 122A as the spare system, assuming that the configuration 1 hardware systems and configuration 2 hardware systems were in the same class.

The operations 1400 include, at block 1415, causing the instantiation of software executing on the failing hardware system on the identified spare hardware system. In one embodiment, system management service 137 consults current hardware allocation map 1310 to determine which software or services were provisioned with the failing hardware system and sending one or more messages to other internal services 133 to launch corresponding software or services on the spare hardware system.

The operations 1400 include, at block 1420, causing the transfer of state associated with software and/or data from failing hardware system to spare hardware system. In some embodiments, state includes the state of the software programs and/or associated data as preserved in the processor(s) and memories (e.g., RAM, ROM, attached storage drive(s), etc.). For example, state may be transferred during an idle period by imaging the various memories and transferring the images to the spare hardware system. In some embodiments, during the period of time in which operations 1420, and perhaps 1415, are being performed, the provider system 100 buffers traffic sent to the failing hardware system to later send to the spare hardware system once operations at blocks 1415 and 1420 have completed, reducing the risk of data corruption or loss associated with continued operation of the failing hardware system during the transfer of state. In some embodiments, block 1420 is omitted if the program(s) running on the hardware system are or are effectively stateless (e.g., a web server serving web pages with a static set of content). In other embodiments, where the preservation of state is not possible by the provider, the operations at block 1420 may be performed by customer or user software. In such a case, system management service 137 sends a message to the customer software to notify it of a pending transfer along with the identity of the spare hardware system. The customer software could transfer the state and, upon completion of the transfer, notify system management service 137 to proceed to the operations at block 1425.

Once state has transferred (if necessary), the operations 1400 include, at block 1425, causing the rerouting of data traffic from the failing hardware system to the spare hardware system. System management service 137 may send one or more messages to other internal service(s) 133 within provider system 100 to effectuate the rerouting. Finally, the operations 1400 include, at block 1430, removing the failing hardware system from the available hardware pool. Such may be achieved by setting a flag or other indication associated with the hardware system in the hardware pool database 1305 to mark the hardware system and/or component failing the check and to ensure it or its upper level system is not allocated or provisioned. In addition, at block 1430, a notification may be sent to an operator or data center technician that identifies the failing hardware system for additional testing, repair, or replacement. In some embodiments, blocks 1410 through 1425 may be skipped if, for example, the identified component or system is not allocated by the system management service 137 (e.g., is idle or part of a spare hardware system pool). In such a case, the system management service 137 could remove or flag the failing hardware system in the hardware pool database 1305 so that the component or system cannot be provisioned in response to future provisioning requests. Once the failing component has been replaced or repaired and its associated hardware system is operating normally, the flag could be removed so the component becomes available to the manager 1315.

In some embodiments, operations 1400 may isolate component(s) within a hardware system without isolating the entire hardware system. For example, if the failing component was a storage drive in a system with an idle or unprovisioned storage drives, the operations could include identifying the idle storage drive as the spare, causing a transfer of the data stored on the failing storage drive to the spare storage drive, and causing the hardware system to address the spare storage drive in place of the failing storage drive. The granularity at which to determine whether to isolate a system or a component of a system (e.g., a sub-system) may be based in part on whether the system or its component can be replaced "on-line" without interrupting other parts of the system.

Figure 15:
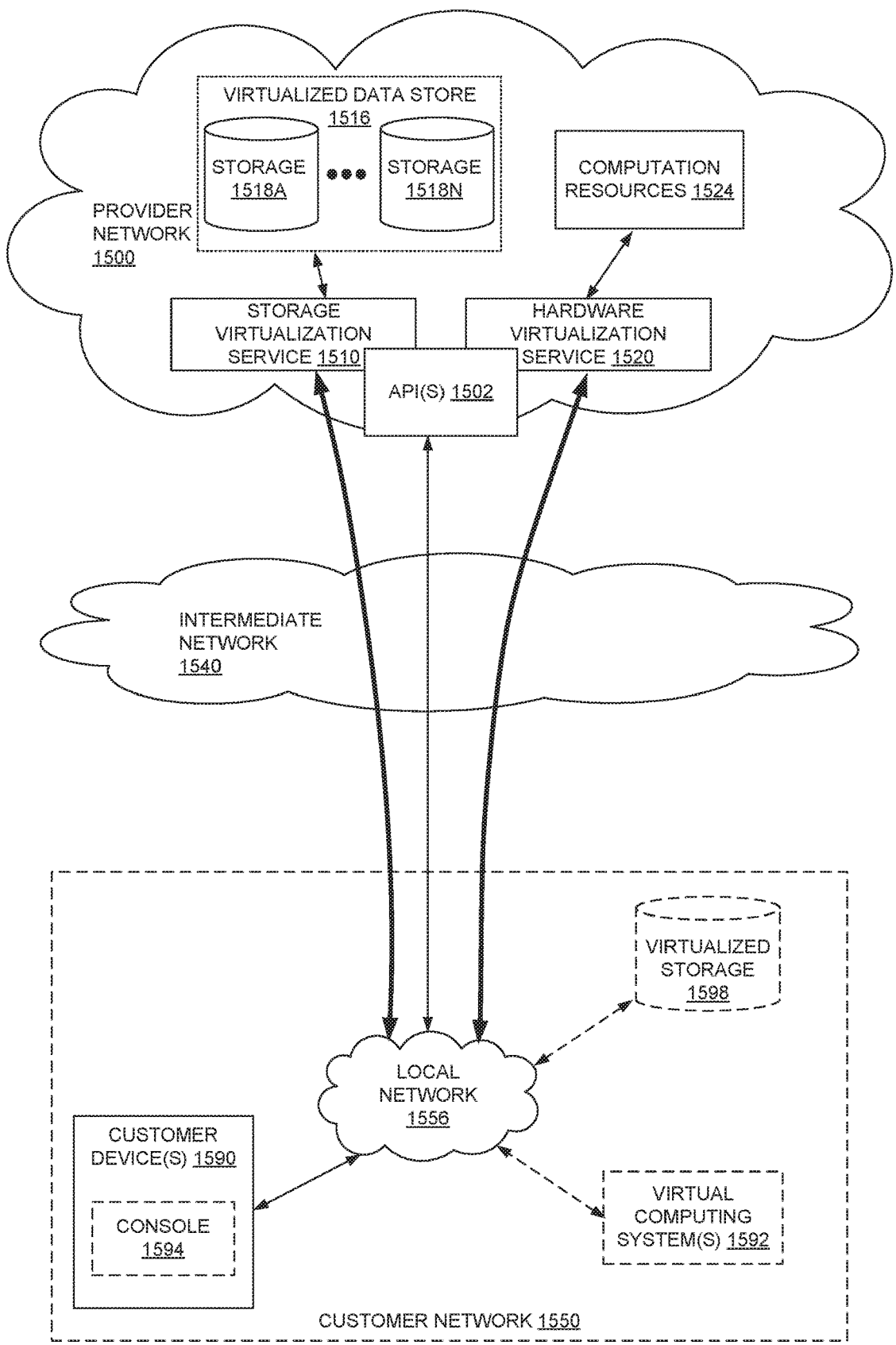
FIG. 15 is a block diagram of an example provider network that provides a storage virtualization service and a hardware virtualization service to customers according to some embodiments.

FIG. 15 is a block diagram of an example provider network that provides a storage virtualization service and a hardware virtualization service to customers according to some embodiments. Hardware virtualization service 1520 provides multiple computation resources 1524 (e.g., VMs) to customers. The computation resources 1524 may, for example, be rented or leased to customers of the provider network 1500 (e.g., to a customer that implements customer network 1550). Each computation resource 1524 may be provided with one or more local IP addresses. Provider network 1500 may be configured to route packets from the local IP addresses of the computation resources 1524 to public Internet destinations, and from public Internet sources to the local IP addresses of computation resources 1524.

Provider network 1500 may provide a customer network 1550, for example coupled to intermediate network 1540 via local network 1556, the ability to implement virtual computing systems 1592 via hardware virtualization service 1520 coupled to intermediate network 1540 and to provider network 1500. In some embodiments, hardware virtualization service 1520 may provide one or more APIs 1502, for example a web services interface, via which a customer network 1550 may access functionality provided by the hardware virtualization service 1520, for example via a console 1594 (e.g., a web-based application, standalone application, mobile application, etc.). In some embodiments, at the provider network 1500, each virtual computing system 1592 at customer network 1550 may correspond to a computation resource 1524 that is leased, rented, or otherwise provided to customer network 1550.

From an instance of a virtual computing system 1592 and/or another customer device 1590 (e.g., via console 1594), the customer may access the functionality of storage virtualization service 1510, for example via one or more APIs 1502, to access data from and store data to storage resources 1518A-1518N of a virtual data store 1516 provided by the provider network 1500. In some embodiments, a virtualized data store gateway (not shown) may be provided at the customer network 1550 that may locally cache at least some data, for example frequently accessed or critical data, and that may communicate with virtualized data store service 1510 via one or more communications channels to upload new or modified data from a local cache so that the primary store of data (virtualized data store 1516) is maintained. In some embodiments, a user, via a virtual computing system 1592 and/or on another customer device 1590, may mount and access virtual data store 1516 volumes, which appear to the user as local virtualized storage 1598.

While not shown in FIG. 15, the virtualization service(s) may also be accessed from resource instances within the provider network 1500 via API(s) 1502. For example, a customer, appliance service provider, or other entity may access a virtualization service from within a respective virtual network on the provider network 1500 via an API 1502 to request allocation of one or more resource instances within the virtual network or within another virtual network.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 121A-121X) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method performed by a proxy for an input/output (I/O) device comprising:
   receiving a baseline performance metric value from a system monitoring service, wherein the baseline performance metric value represents a maximum latency associated with an operation with the I/O device in a computer system having a certain configuration, and wherein the baseline performance metric value is determined based at least in part on a statistical analysis of a set of collected performance metrics associated with the I/O device and application of one or more configuration parameters associated with the I/O device to the statistical analysis of the set of performance metrics;

receiving a request generated by a first computing device to perform the operation, the request directed to the I/O device;

starting a timer having a duration based on the baseline performance metric value associated with the operation, wherein the baseline performance metric value is determined based on obtained and aggregated performance metrics associated with the I/O device;

sending the received request to perform the operation to the I/O device;

generating an error message upon expiration of the duration of the timer before a response to the request is received from the I/O device;

sending the generated error message to a second computing device to cause the second computing device to perform at least one action in response to the generated error message;

receiving a response from the I/O device after expiration of the duration of the timer; and suppressing the received response from the I/O device.

2. The computer-implemented method of claim 1, wherein the request is received via a first interconnect interface and the received request is sent via a second interconnect interface.

3. A non-transitory computer-readable storage medium storing computer program instructions comprising functionality for performing, by a proxy for a second device:

receiving a baseline performance metric value from a system monitoring service, wherein the baseline performance metric value represents a maximum latency associated with an operation with the second device in a computer system having a certain configuration, and wherein the baseline performance metric value is determined based at least in part on a statistical analysis of a set of collected performance metrics associated with the I/O device and application of one or more configuration parameters associated with the I/O device to the statistical analysis of the set of performance metrics;

receiving a request generated by a first device to perform an operation with the second device, the request directed to the second device;

starting a timer having a duration based on a baseline performance metric value associated with the operation, wherein the baseline performance metric value is determined based on obtained and aggregated performance metrics associated with the second device;

sending the received request to perform the operation to the second device;

generating an error message upon expiration of the duration of the timer before a response to the request is received from the second device;

sending the generated error message to cause at least one action in response to the generated error message;

receiving a response from the second device after expiration of the duration of the timer; and suppressing the received response from the second device.

4. The computer-implemented method of claim 3, wherein the proxy is part of a hypervisor program executing on the first device, and wherein the request is received from an operating system program executing on the first device.

5. The computer-implemented method of claim 4, wherein the received request is generated in part by an application programming interface call to a device driver associated with the second device.

6. The computer-implemented method of claim 4, wherein sending the generated error message comprises sending the generated error message to the operating system program.

7. The computer-implemented method of claim 4, wherein the action comprises retrying the request to the second device.

8. The computer-implemented method of claim 3, wherein the proxy is part of an offload program executing on a third device coupled to the first device via a first interconnect, and wherein the request is received via the first interconnect.

9. The computer-implemented method of claim 8, wherein the received request is sent via a second interconnect that couples the third device to the second device.

10. The computer-implemented method of claim 8, wherein sending the generated error message comprises initiating a transaction over the first interconnect.

11. The computer-implemented method of claim 3, wherein the aggregated performance metrics associated with the second device include obtained performance metrics for the second device and performance metrics associated with a class of one or more components associated with the second device.

12. The computer-implemented method of claim 3, wherein the baseline performance metric value is determined by performing a statistical analysis of the aggregated performance metrics associated with the second device and applying one or more configuration parameters to a result of the statistical analysis.

13. The computer-implemented method of claim 3, further comprising recording a measured time for receiving the response from the second device.

14. A system comprising:

an input/output (I/O) device;

a processor coupled to the I/O device via a first interconnect; and a memory coupled to the processor, the memory storing instructions which, when executed by the processor, cause the processor to implement a proxy to:

receive a baseline performance metric value from a system monitoring service, wherein the baseline performance metric value represents a maximum latency associated with an operation with the I/O device in a computer system having a certain configuration, and wherein the baseline performance metric value is determined based at least in part on a statistical analysis of a set of collected performance metrics associated with the I/O device and application of one or more configuration parameters associated with the I/O device to the statistical analysis of the set of performance metrics;

receive a request to perform an operation directed to the I/O device;

start a timer having a duration based on a baseline performance metric value associated with the operation, wherein the baseline performance metric value is determined based on obtained and aggregated performance metrics associated with the I/O device, and wherein the baseline performance metric value represents a maximum latency associated with the operation with to the I/O device in a computer system having a certain configuration;

send the received request to perform the operation to the I/O device via the first interconnect;

generate an error message upon expiration of the duration of the timer before a response to the request is received from the I/O device;

send the generated error message to cause at least one action in response to the generated error message;

receive a response from the I/O device after expiration of the duration of the timer; and suppress the received response from the I/O device.

15. The system of claim 14, wherein the proxy is part of a hypervisor program executed by the processor, and wherein the request is received from an operating system program executed by the processor.

16. The system of claim 15, wherein the received request is generated in part by an application programming interface call to a device driver associated with the I/O device.

17. The system of claim 15, wherein the generated error message is sent by the proxy to the operating system program.

18. The system of claim 15, wherein the action comprises retrying the request to the I/O device.

19. The system of claim 14, wherein the proxy is part of an offload program, wherein the processor is coupled to another processor via a second interconnect, and wherein the request is received from the another processor via the second interconnect.

20. The system of claim 19, wherein the generated error message is sent by the proxy to the another processor via the second interconnect.

* * * * *